United States Statutory Invention Registration [19]

[11] Reg. Number: H1006

Zwicke

[43] Published: Dec. 3, 1991

[54] MULTILEVEL CLASSIFIER STRUCTURE FOR GAS TURBINE ENGINES

[75] Inventor: Phillip E. Zwicke, Santa Barbara, Calif.

[73] Assignee: The United States of America as represented by the Secretary of the Air Force, Washington, D.C.

[21] Appl. No.: 499,935

[22] Filed: Mar. 27, 1990

[51] Int. Cl.[5] ..... G01B 7/16

[52] U.S. Cl. ..... 364/551.01; 364/431.02; 364/508; 364/571.04; 73/579; 73/583; 73/660; 73/763; 73/768; 73/772; 73/802

[58] Field of Search ..... 364/551.01, 550, 431.01, 364/431.02, 508, 571.04; 73/570, 579, 583, 584, 602, 660, 760, 763, 768, 772, 802; 60/39.29

[56] References Cited

U.S. PATENT DOCUMENTS

| | | | |
|---|---|---|---|
| 4,453,407 | 6/1984 | Sato et al. | 73/660 X |
| 4,590,562 | 5/1986 | Zwicke et al. | 364/431.02 |
| 4,604,702 | 8/1986 | Zwicke | 364/431.02 |
| 4,615,008 | 9/1986 | Rosenbush et al. | 364/431.02 |
| 4,955,269 | 9/1990 | Kendig et al. | 73/660 X |
| 4,967,550 | 11/1990 | Acton et al. | 60/39.29 |

*Primary Examiner*—Linda J. Wallace

*Attorney, Agent, or Firm*—William G. Auton; Donald J. Singer

[57] ABSTRACT

A signal classifier system is disclosed that includes an on-line apparatus for monitoring various electrical signal inputs derived from vibration signals without data interruption, and providing an output from each of several levels of classifications. Classification is by a three-level classification algorithm. A first level of classification provides for the independent processing without structural or operational information of each signal input. The output of the first level is stored according to a strain gauge in a spatial file. The second level of classification provides a combination of the output of the spatial file with structural information (such as compressor structural information) and on-line operational information to provide an output indicative of event probabilities which are stored. Finally, in a third level of classification, there is a temporal combination of event probabilities and on-line operational information, off-line a priori information and data from sensors to produce an output indicative of running probabilities for a particular phenomena. The final output will provide a prediction, for example, of a source of vibration and other aeromechanical phenomena during operation of turbomachinery, such as a gas turbine engine.

3 Claims, 28 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ROTATING STALL

CIRCUMFERENTIALLY NONUNIFORM FLOW

SURGE

AXIALLY OSCILLATING FLOW ( STRAIN-GAGE SUBDIVISION, STRAIN GAGE N )

MULTILEVEL CLASSIFIER STRUCTURE FOR GAS TURBINE ENGINES

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to diagnostic systems that monitor the performance of gas turbine engines, and more specifically to a multilevel digital data diagnostic system.

Turbo-jet engines use a rotary compressor whose blades compress air into a pressurized medium. This medium is combined with fuel and ignited in a combustion chamber to produce a thrust exhaust. What is interesting about these engines is the thrust exhaust of the combustion chamber is used to spin a turbine which drives the compressor, as well as to propell the jet. In the case of the turbo-jet engine, all of the work generated by the turbine is used up by the compressor and by the auxiliaries, such as the fuel pumps, generators, and oil pumps.

As mentioned above, the thrust exhaust spins a turbine which axially drives the compressor with a moment of inertial that produces resultant stresses on the compressor blades. These resultant stresses are manifested on the blade surface in the form of a tensile stress that is capable of bending the leading edge, trailing edge or the entire blade structure. The task of providing a diagnostic system that monitors the aeromechanical performance of gas turbine engines is alleviated, to some extent, by the systems disclosed in the following U.S. patents, the disclosures of which are incorporated herein by reference:

U.S. Pat. No. 4,402,054 issued to Osborne et al;
U.S. Pat. No. 4,435,770 issued to Shiohata et al;
U.S. Pat. No. 4,437,163 issued to Kurihara et al; and
U.S. Pat. No. 4,644,479 issued to Kemper et al.

Osborne et al disclose a monitoring apparatus capable of automatically diagnosing a system malfunction with some degree of probability. Shiohata et al disclose aparatus for diagnosing vibration in a rotor of a rotary machine. The apparatus generally includes sensing means for sensing and providing an output indicative of rotation of a rotor, a detector for detecting vibration at each of several locations along the rotor shaft and providing an output representative of a vibration, and means to analyze the outputs, compare the analyzed outputs with reference values, calculate abnormal vibration components, and compare the abnormal vibration components with previously obtained values at the same measuring locations. Kurihara et al disclose apparatus and methods somewhat similar to those disclosed by Shiohata et al.

Finally, Kemper et al disclose diagnostic apparatus to monitor a steam-turbine generator power plant. The apparatus includes a plurality of sensors to monitor and provide an output of a parameter, and control means operable to establish a first, second and third subsystem responsive to sensor signals. The sensor signals provide an output of change in sensor readings, validated conclusions with a certain confidence factor responsive to selected one of the change indications, and validated conclusions relative to sensor signals, respectively.

While the above-cited references are instructive, the need remains to provide an active digital classifier system that constantly monitors and diagnoses the aeromechanical performance of gas turbine engine systems. The present invention is intended to satisfy that need.

SUMMARY OF THE INVENTION

The invention is a signal classifier that includes an on-line apparatus for monitoring various electrical signal inputs derived from vibration signals without data interruption, and providing an output from each of several levels of classifications.

Up to 100 strain-gage channels are incorporated into the system on a modular basis. A one-per-rev signal provides engine speed information. Each channel carries an analog signal to a data acquisition module. The signal is digitized and 4K of data corresponding to 0.8 sec. is buffered. An array processor calculates the stress, histogram, and FFT global features for 15 to 20 channels. The actual number of channels depends on the particular array processor selected. A supervisory minicomputer uses the global features from all channels to classify the aeromechanical phenomena and to take evasive action if necessary. The minicomputer operates in parallel with the array processor. The overall system is expected to produce real time displays within a one to two second update rate during online operation.

Classification is by a three level classification algorithm. A first level of classification provides for the independent processing without structural or operational information of each signal input. The output of the first level is stored according to a strain gauge in a spatial file. The second level of classification provides a combination of the output of the spatial file with structural information (such as compressor structural information) an on-line operational information to provide an output indicative of event probabilities which are stored.

In a third level of classification, there is a temporal combination of event probabilities and on-line operational information, off-line a priori information and data from sensors to produce an output indicative of running probabilities for a particular phenomena. The final output will provide a prediction, for example, of a source of vibration and other aeromechanical phenomena during operation of turbomachinery, such as a gas turbine engine. The various electrical signal reports may be derived from each of a multiplicity of strain gauges, or other type sensor, associated with the engine; and the output is represented by one or more decisions (answers) indicating, for example, a source and cause of vibration. Furthermore, the output represents a probability of quality of decision in terms of confidence in the output (zero to 100% confidence). An output is achieved usually in no more than about two seconds' time.

It is an object of the present invention to identify aeromechanical phenomena in a gas turbine engine using a digital diagnostics system which receives signals from strain gages placed on the compressor of the engine.

It is another object of the invention to correlate actual strain gage signals with a set of stored strain signals that are characteristic of aeromechanical phenomena that includes: flutter, separated flow vibration; a missing vane blade, a rotating stall, surge, blade rub, nonresonant vibration, and short circuits.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention includes a three-level digital diagnostics system that monitors the general, spatial, and temporal aeromechanical performance of gas turbine engines for the purpose of predicting and classifying transient phenomena as well as steady state conditions.

Figure 1:
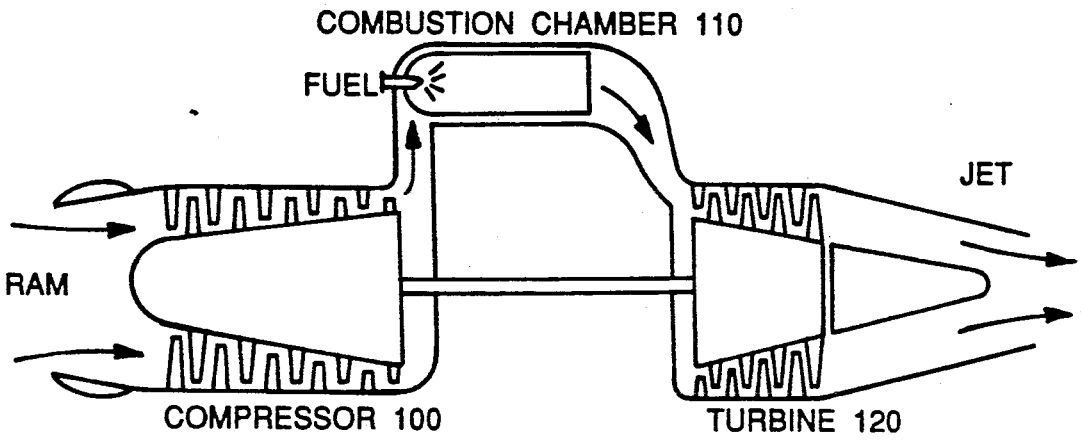
FIG. 1 PRIOR ART
FIG. 1 is an illustration of a prior art gas turbine engine.

The reader's attention is now directed towards FIG. 1, which is a schematic diagram of a jet-propulsion gas turbine engine. The purpose of FIG. 1 is to illustrate the elements of the turbo-jet engine in order to explain the forces and problems that are monitored by the present invention.

The system of FIG. 1 receives air from the forward velocity of the jet into the rotary compressor 100 which uses an axial set of rotating blades which revolve within a annular set of stationary blades to provide compressed air to the combustion chamber 110, where fuel is added and burned.

The exhaust of the combustion chamber 110 drives a turbine wheel 120 before exiting through the exit nozzle to propel the jet. The turbine wheel is connected by a drive shaft back to the rotary compressor. In this arrangement, the thrust exhaust spins the turbine which axially drives the compressor with a moment of inertia that produces resultant stresses on the compressor blades.

Figure 2:
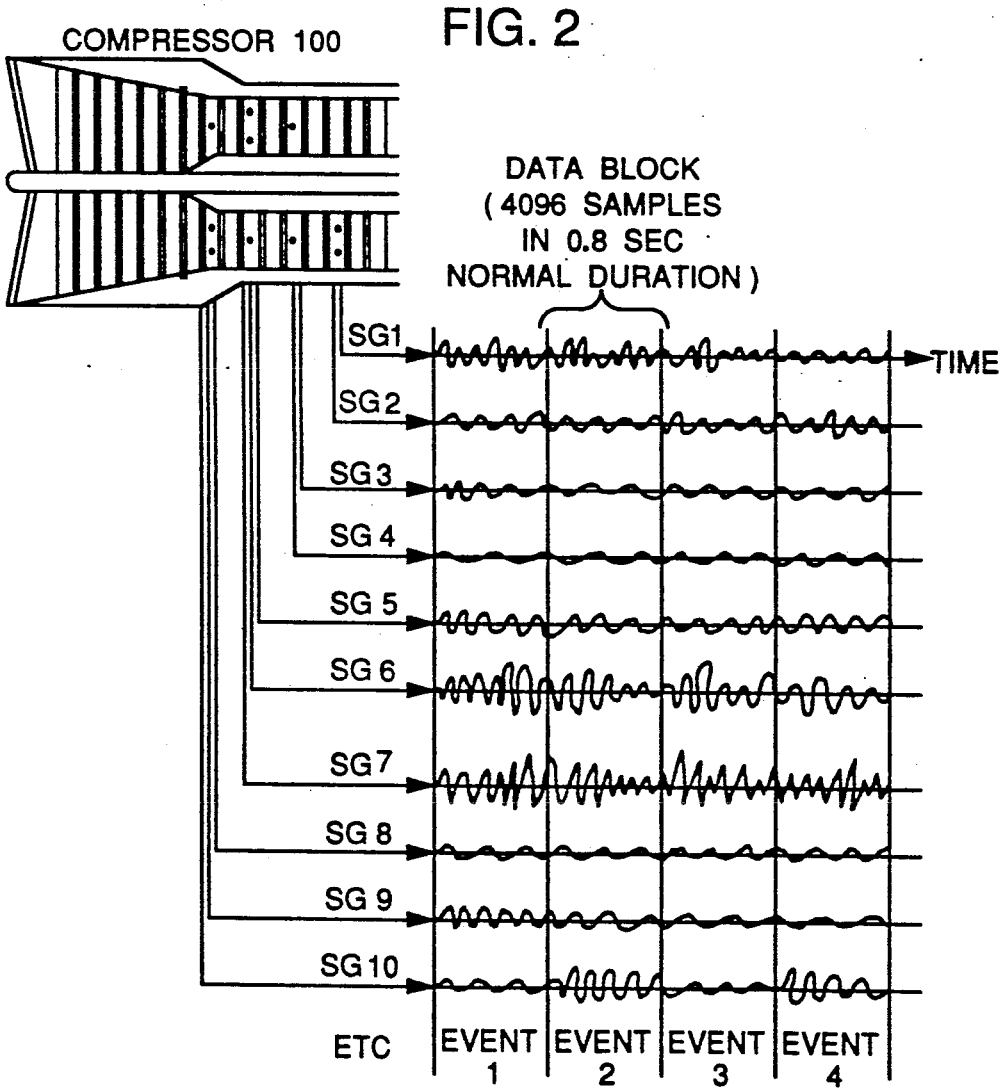
FIG. 2 is an illustration of the strain gage monitoring system used on the compressor of the engine of FIG. 1.

In operation the gas turbine engine of FIG. 1 needs to be monitored since the stresses are capable of bending the blade structure of the compressor. The present invention actively monitors the stresses and resonant vibrations in the compressor stage with a digital diagnostics system that uses a plurality of strain gages which are mounted on the compressor. FIG. 2 is an illustration of the compressor 100 of FIG. 1 with ten strain gages (SG1–SG10) mounted within its blade structure to respectively produce ten analog strain data signals of the strain forces encountered in the operation of the engine.

The illustration of FIG. 2 is just intended to serve as an example of the sensing network used in the present invention. In the preferred embodiment, the strain gage classified is an on-line monitoring system that processes up to 100 strain gage signals from commertially-available strain gages that have a spatial distribution that is recorded in a special memory file in the classified. The reader's attention is directed towards FIG. 3, which is a block diagram of the strain gage data flow of the classified. Before proceeding to the details of FIG. 3, it is important to understand the general concept of the present invention. This is discussed in the paragraph that follows.

The invention is a signal classifier system that includes an on-line apparatus for monitoring various electrical signal inputs derived from vibration signals without data interruption, and providing an output from each of several levels of classifications. Classification is by a three level classification algorithm. A first level of classification provides for the independent processing without structural or operational information of each signal input. The output of the first level is stored according to a strain gauge in a spatial file. The second level of classification provides a combination of the output of the spatial file with structural information (such as compressor structural information) and on-line operational information to provide an output indicative of event probabilities which are stored. Finally, in a third level of classification, there is a temporal combination of event probabilities and on-line operational information, off-line a priori information and data from sensors to produce an output indicative of running probabilities for a particular phenomena. The final output will provide a prediction, for example, of a source of vibration and other aeromechanical phenomena during operation of turbomachinery, such as a gas turbine engine. The various electrical signal reports may be derived from each of a multiplicity of strain gauges, or other type sensor, associated with the engine; and the output is represented by one or more decisions (answers) indicating, for example, a source and cause of vibration.

Furthermore, the output represents a probability of quality of decision in terms of confidence in the output (zero to 100% confidence). An output is achieved usually in no more than about two seconds' time.

Returning to FIG. 3, the analog strain signal from the strain gage 300 is converted into its digital equivalent by the analog-to-digital A/D converter 301, and processed by the classifier in the manner discussed briefly above.

Figure 3:
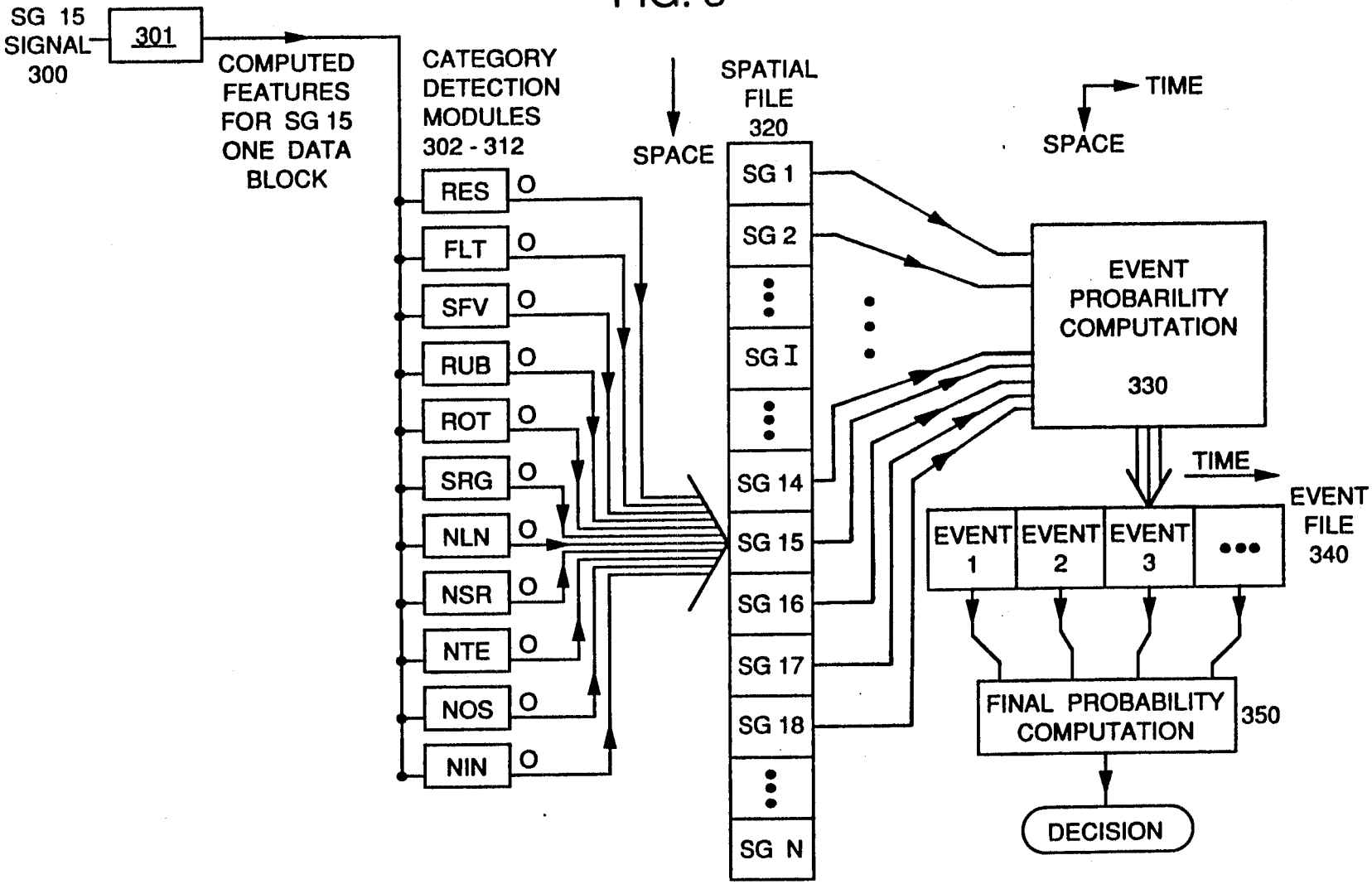
FIG. 3 is a block diagram of the strain gage data flow of the classified.

The aeromechanical phenomena to be detected are distributed both spatially and temporally. To best match this physical situation a three level classification algorithm has been developed. The first level is the individual strain-gage classification level. Each strain gage is processed independently using global features extracted from its vibration signal. No explicit structural or operational information is used at this level. The output of the first level is a set of pseudoprobabilities or quality values (Q) along with corresponding features for each of the aeromechanical phenomena. The Q values range from zero to unity, with zero indicating the strain-gage signal does not match the phenomenon, and unity indicating a perfect match. The output from the first level of classification is stored according to strain gage is an external file called the spatial file. The first level of classification is complete when all strain-gage signals have been processed and their corresponding Q values stored in the Spatial file. As indicated in FIG. 3, the digitized signal from the strain gage 300 is received and processed by eleven category detection modules 302–312, each of which produce an output Q indicates the pseudoprobability that its particular category of phenomena has been detected by the particular strain gage. These categories will be elaborated upon after a discussion of the two other levels of classification.

The second level of classification is spatial combination. The individual strain-gage results stored in the Spatial file 320 are combined with compressor structural information and on-line operational information to produce event probabilities for the phenomena. The event probabilities are stored in the Event file 340.

The third level of classification is temporal combination. The event probabilities stored in the Event file 340 are combined with on-line operational information, off-line a priori information and data from other sensors to produce final or running probabilities for the phenomena. The final probabilities are reported to the operator and are updated after each event.

The strain gage sensor system of FIG. 3 is able to monitor and interpret strain gage signals from jet engine compressor stages to diagnose different aeromechanical phenomena, including flutter, resonance and off resonance forced vibration, separated flow vibration, rotating stall and surge, rotor or stater tip rub, and unlatched stator vane.

Figure 4:
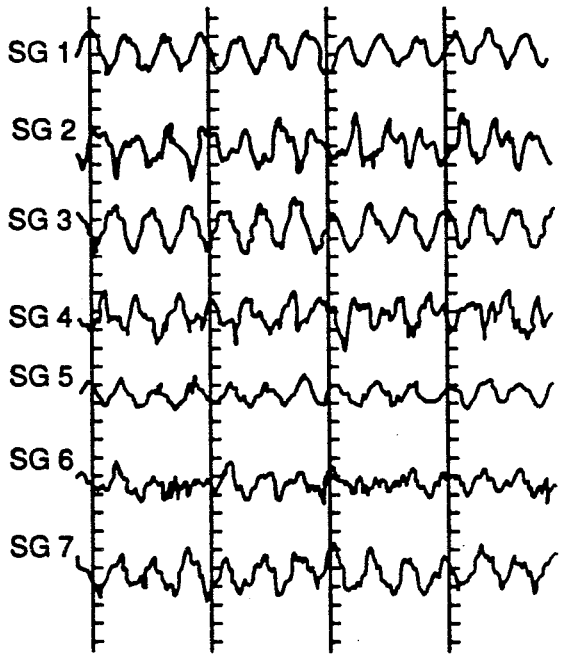
FIG. 4 is a chart of strain gage signals from seven strain gages anticipated in response to blade flutter.

Flutter is a self-excited unstable motion of the blade caused by a net unidirectional energy flow from the airstream into the compressor blade. The frequency of flutter vibration is usually not an integral multiple of the engine rotational frequency, though integral order flutter may occassionally occur. FIG. 4 shows typical strain gage responses associated with a high-speed torsional flutter condition. In deep flutter all blades vibrate at the same frequency and the interblade phase angle is fixed as shown in FIG. 4. It is generally safe to back off the flutter boundary by reversing the operating conditions the test vehicle went through earlier when approaching the flutter boundary.

The chart of FIG. 4 shows strain gage signals anticipated from seven different strain gages in response to a blade flutter condition. The gage locations on the engine as given by FIG. 2.

Figure 5:
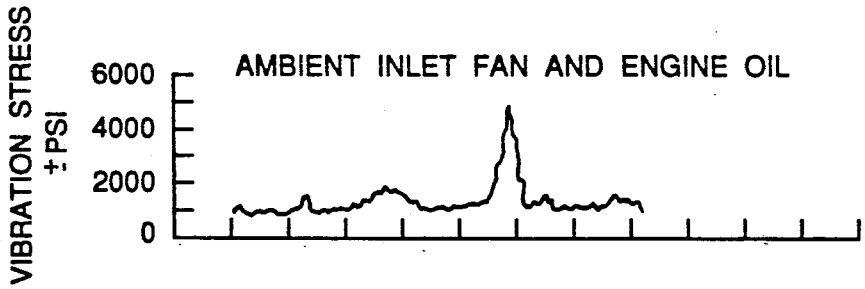
FIG. 5 and 6 are charts of stress characteristics in response to engine speed changes.
Figure 6:
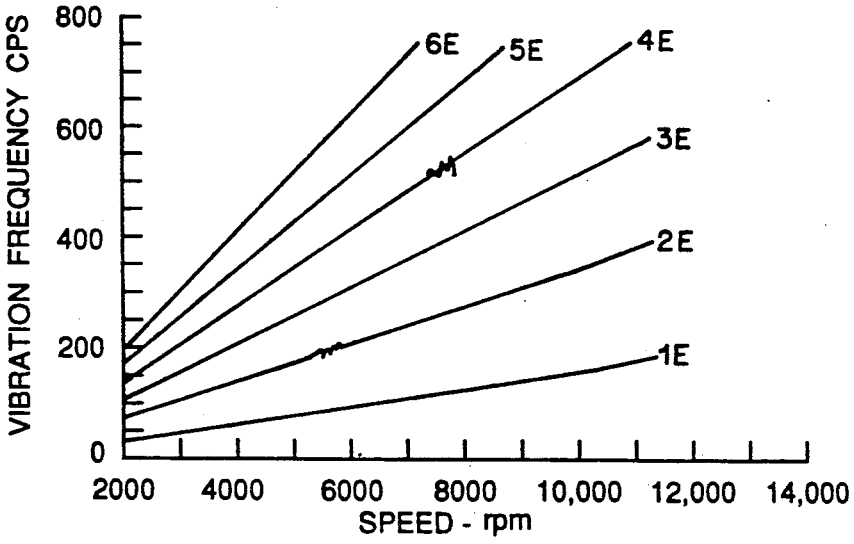
Figure 7:
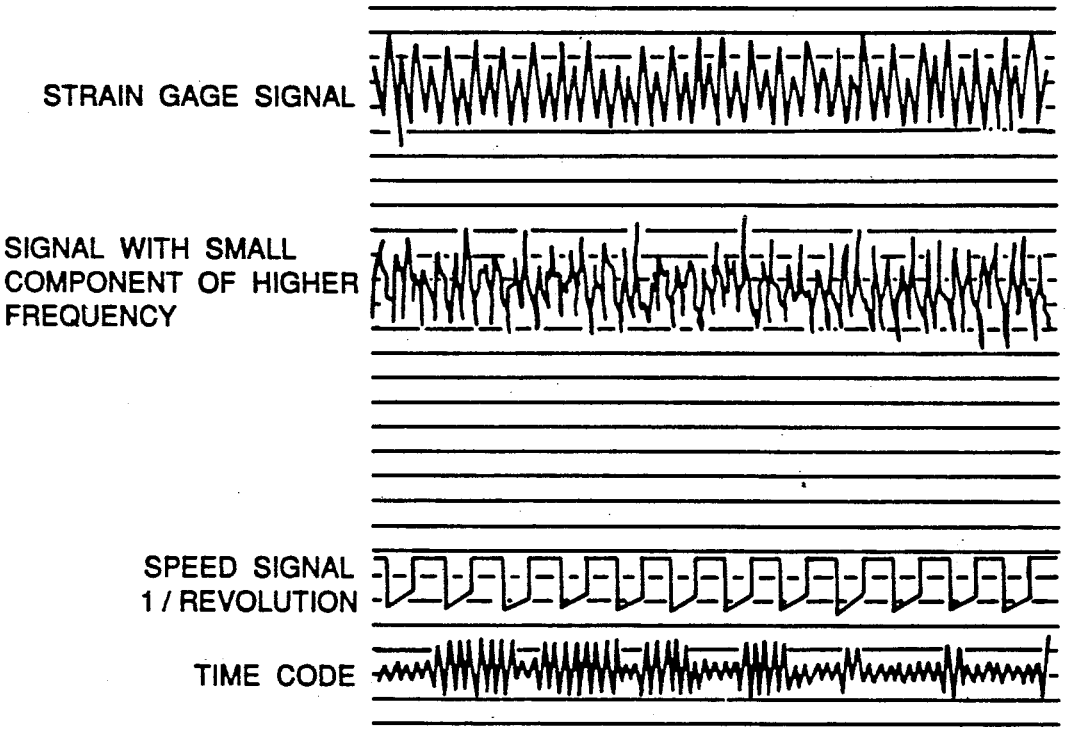
FIG. 7 is a chart of strain gage signals in response to engine blade resonant vibration.

Resonance is a periodic damped motion of blades excited by a periodic aerodynamic forcing function whose frequency matches the blade natural frequency. The possible sources of resonant vibration are inlet distortion, structural struts, instrumentation, burner cans or nozzles among others. The blade response frequency is necessarily an integral multiple of the engine rotations frequency. FIGS. 5 and 6 show typical resonance stress growth with speed change. An example waveform of resonant vibration containing stron 4 engine order and weak 2 engine order responses is shown in FIG. 7. The waveform of resonant vibration in general stands still on monitor scopes with scope sweeps triggered by the engine per-rev signal. Resonant vibration can be cleared by either decelleration or accelleration of the engine.

Figure 8:
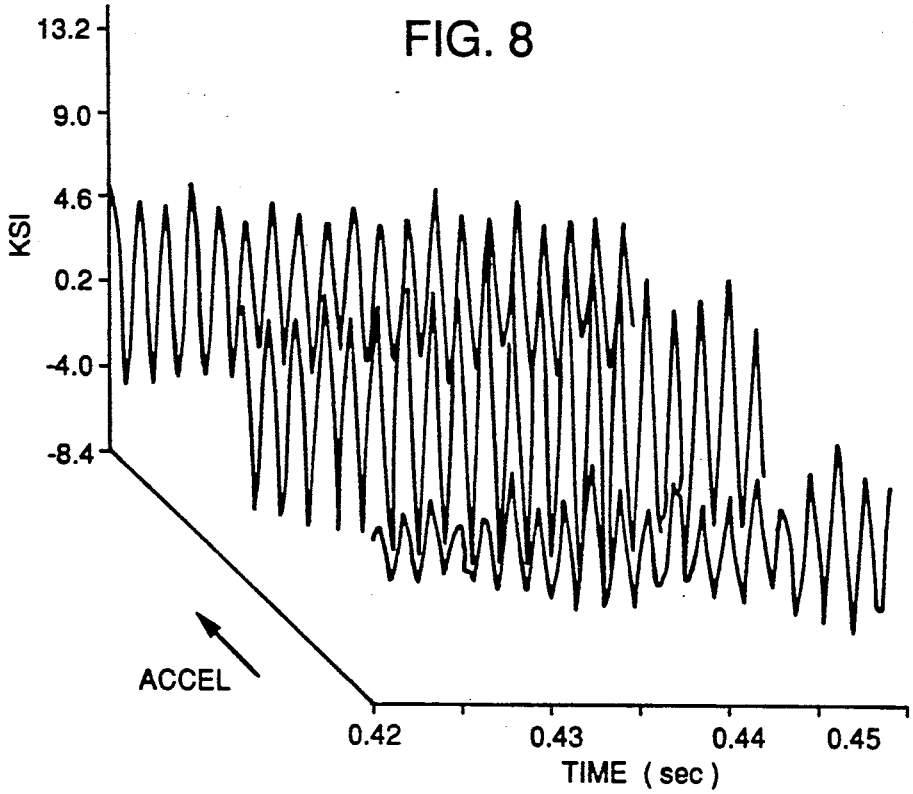
FIG. 8 is a chart of waveforms of separated flow vibration.

Separated flow vibration, also called buffeting, is an irregular damped motion of the blades excited by turbulence in the flow field. It usually shows as a multimode (i.e., multi-frequency) response with amplitude varying randomly in time. It often occurs toward the stall line or before stall flutter occurs. Typical responses are shown in FIG. 8.

Figure 9:
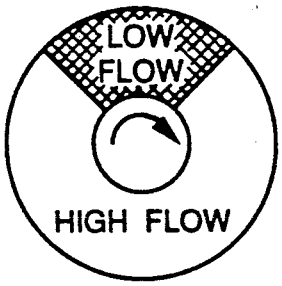
FIGS. 9 and 10 are illustrations of possible modes of instability on the stall line.
Figure 10:
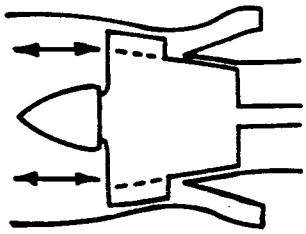
Figure 11:
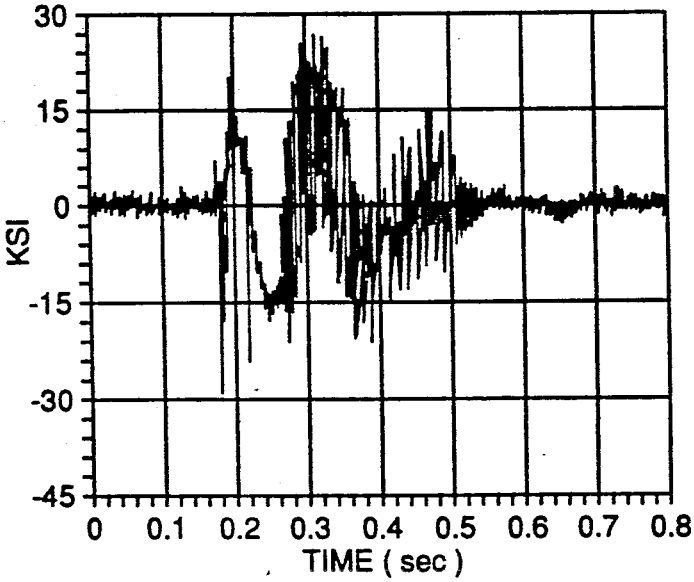
FIG. 11 is the anticipated strain gage waveform in the presence of a surge and rotating stall.

As the flow through an axial compressor is throttled from the design point to the stall limit, the steady, axisymetric flow pattern that exists becomes unstable. The phenomenon resulting from this instability can take one of two forms. These are known as surge and rotating stall. The two types of behavior are illustrated schematically in FIGS. 9 and 10. Surge is a large amplitude oscillation of the total annulus averaged flow through the compressor; whereas in rotating stall, one finds from one to several cells, and, in fact, during a surge cycle, the compressor may pass in and out of rotating stall as the mass flow changes with time. Examples of strain-gage rotating stall and surge responses are shown in FIG. 11. FIG. 11 is a chart depicting the strain gage signals characteristic of the waveform of a surge and rotating stall.

To the compressor test engineers, it is important to know which of these modes of instability occurs during stall since their consequences can be quite different. For example, once rotating stall is encountered, it may not be possible to return to an unstalled condition merely by opening the throttle, because of system hysteresis effects. In this situation, the only way to come out of stall may be to decrease rotational speed considerably, resulting in a sizeable loss in pressure ratio. Also, because of the extremely low efficiencies associated with the presence of rotating stall (efficiencies below twenty percent have been measured) operation for any substantial length of time in this mode can result in excessive internal temperatures which have an adverse effect on blade life, as do the large stresses resulting from the unsteady flow filed. In addition, an even more serious consequence that can occur in an engine is that the low flow rates obtained during rotating stall can lead to substantial overtemperatures in the burner and turbine.

On the other hand, if surge occurs, the transient consequence, such as large inlet overpressures, can also be severe, However, the circumstances may well be more favorable for returning to unstalled operation by opening either the throttle or internal bleeds, since the compressor can be operating in an unstalled condition over part of each surge cycle. For this reason, it is important to know which of these two types of behavior occurs during compressor stall.

Figure 12:
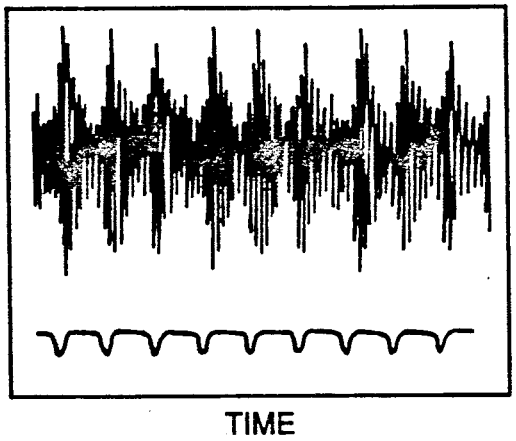
FIG. 12 is an oscillograph of a strain gage signal in the presence of a blade tip-rub condition.

This usually occurs once (or rarely, several times) per rotor revolution due to obstruction(s) originating from the casing or hub. A typical waveform of tip rub would show kick-in stress once per revolution as shown in FIG. 12. Rubbing is often, though not always, a self-clearing phenomenon.

Occassionally, a vane may become loose due to either control system malfunction or severely bent lever arm. The off-angle of the loose vane may be large enough to cause the neighboring rotor blades to respond with one-per-rev type spikes. The response would appear to have much larger amplitude variation than the tip-rub response.

The major characteristics of various kinds of aeromechanical phenomena are listed in Table 1. The columns of Table 1 corresponding to the nine vibration phenomena under study are denoted by the following abbreviations:

TABLE 1

RES=Resonance
FLT=Flutter
SFV=Separated Flow Vibration
VAN=Misrigged or missing vane
ROT=Rotating stall
SRG=Surge
RUB=Blade Rub
NRV=NonResonant Forced Vibration
SCT=Short Circuit Noise is defined as an apparent strain-gage response that is unrelated to actual blade vibrations. It is desirable during compressor testing to isolate noise from true aeromechanical responses so that testing can proceed with no unnecessary interruption. Because there are many possible sources of noise, either identifiable or unidentifiable, the classification of noise is at least as challenging as that of true aeromechanical responses. Discussed below are those types of noise that are better understood and considered most important in the overall noise category of strain-gage responses.

Line noise originates from power source and always has frequency of 60-Hz and/or higher harmonics. The slip ring noise is primarily due to poor brush contact (mechanical slip ring). Initial deterioration of the slip ring assembly creates one-per-rev type strain-gage response. As time progresses, grass look responses would arise. In any case, the signal is usually one sided and generally occurs for blades linked to the same deteriorated slip ring.

The telemetry noise is generally one-per-rev or two-per-rev in nature depending on the telemetry system design. The noise level relatively constant as speed changes. An open circuit can be caused by strain-gage grid separation or disconnection of electronic instruments and usually produces one sided saturated strain-gage signal. A short circuit can be caused by insulation breakdown of strain-gage grid or electronic components and generally produces zero apparent strain level.

Sometimes, strain gages show large responses similar to flutter or resonance when the actual strain level is low. A full understanding of this unusual phenomena has not been achieved. It is probably caused by local necking down of strain-gage grid wire resulting in discontinuous stress distribution along the grid wire. Sometimes, it can be identified when a substantially higher (say five times) stress level is encountered during testing while the same gage did not experience as high a stress level in previous testing at the same operating condition. The supersensitive gage noise is exceptionally difficult to identify and requires further study to discriminate it from flutter or resonance signals.

Intermittent noise could be caused by electrical disturbances such as switch or cross talks between strain-gage wires, slip ring wires and scope wires due to poor shielding. It can also be caused by mechanical disturbances such as cable whip. It is characterized by nonstationary random bursts of high intensity signals.

In Table 2, the noise characteristics are tabulated for easy reference. It appears that the identification of noises is as challenging as classifying true aeromechanical responses.

TABLE 2

| | NOISE CHARACTERISTICS | | | | | | |
|---|---|---|---|---|---|---|---|
| FEATURE | LINE NOISE | SLIP RING | TELEMETRY | OPEN CIRCUIT | SHORT CIRCUIT | SUPER SENSITIVITY | INTERMITTENT NOISE |
| INTEGRAL UNDER | NO | | YES | NO | | | |
| AMPLITUDE | CONSTANT | | CONSTANT | LARGE SATU-RA-TION | SHARP DROP OF SIGNAL TO ZERO | LARGE | RANDOM |
| FREQUENCY | 60 HZ AND/OR HIGER HAR-MONICS | DIS-CRETE ONE-PER- | TWO-PER-REV | | | | |
| SIGNATURE | PERIODIC IF TIME NOISE DOM-IN-ATES | INI-TIAL-ONE-PER-REV; EVEN TUAL-LY TURN RANDOM GRASSY LOOK; | | ONE-SIDED WAVE-FORM | | | NONSTA-TIONARY RANDOM BURSTS OF HIGH INTENSITY SIGNALS |

TABLE 2-continued

| FEATURE | LINE NOISE | SLIP RING | TELEMETRY | OPEN CIRCUIT | SHORT CIRCUIT | SUPER SENSITIVITY | INTERMITTENT NOISE |
|---|---|---|---|---|---|---|---|
| | | NOISE CHARACTERISTICS | | | | | |
| | | ONE-SIDED | | | | | |
| INTER-BLADE | | | | | | USUALLY ONE BLADE | |
| INTER STATE CONFUSED WITH | | | RESONANCE | LOSS OF BLADE | | RESONANCE OR FLUTTER | |
| OCCURS WITH | | | | OFTEN AFTER SURGE | OFTEN AFTER SURGE | | |
| SPEED DEPEN-DENCE | | SIGNAL DETE-RI-O-RATES AS TIME PRO-GRESSES | EXIST FOR WIDE SPREAD RANGE | CAUSED BY STRAIN GAGE GRID SEPA-RATION OR DIS-CONNEC-TION OF ELEC-TRONIC INSTRU-MENTS, ETC; AMPLI-TUDE STAYS CONSTANT AS SPEED VARIES | CAUSED BY STRAIN GAGE INSUL-ATION BREAK-DOWN OR ELEC-TRONIC INSTRU CIRCUIT SHORT | POSSIBLY CAUSED BY LOCALIZED NECKING DOWN OF STRAIN GAGE GRID | CAUSED BY ELEC-TRICAL OR MECH-ANICAL DISTURB-ANCES |

The phenomena associated with FIGS. 4–12 include: blade flutter, surge and rotating stalls, and blade tip rub conditions, all of which are immediately identifiable by their associated strain gage signals. Samples of such strain-gage data were collected and converted into digital to form a data base that the present invention could compare with sensed signals to diagnose engine conditions.

The data base includes 345 digital signals that correspond to the following vibration types for various test vehicles:

Resonance—$E^3$ (18)
Flutter—TS22 (32)
Separted flow vibration—$E^3$
Misrigged vane—F100 (46)
Rotating stall—$E^3$ (48)
Surge—TS22 (17), F100 (33)
Tip rub—J52 (35)
Noise—$E^3$ (36)
Mixed—$E^3$ (35)

Each piece of digital signal is approximately 1 minute long. The nominal digitizing rate is 5120 Hz (i.e., analyzable frequency range of 2 kHz) with a block size of 4096 points for 21 duration of 0.8 sec. Some surge and rotating stall data, tip-rub data and noises were also digitized at 25.6 kHz to yield an analyzable 10 kHz bandwidth.

A substantial collection of noise data were digitized. But the identification of the noise types associated with those data would require additional effort. Consequently the noise detection modules have been designed solely based on the expected noise characteristics listed in Table 2. The data was delivered to UTRC from P&W on tapes written by a PDP-11 machine. This tape ia a 9-track, 800 bpi, ASCII tape. Each block on the tape contains 4096 words. The P&W tapes were read by a Sperry 1100 program and the data were rewritten to a 9-track, 6250 bpi binary tape for input to the UTRC's Interactive Signal Processing Program (ISPP). Each file on a tape contains strain-gage data of a single Phenomenon from three or four strain gages. A file is structured in blocks of 4096 integer data values. The first block contains header information and RMS values for the three strain-gage sensors and speed or four strain-gage sensors. The following blocks contain data from the three strain-gage sensors and speed or four strain-gage sensors in sequence.

Table 3 shows the structure of the tape.

TABLE 3

| Tape Data Structure | | | |
|---|---|---|---|
| Block No. | Words | Contents | |
| 1 | 1–499 | Header information | |
| | 500–999 | RMS | SG1 |
| | 1000–1499 | RMS | SG2 |
| | 1500–1999 | RMS | SG3 |
| | 2000–2499 | RMS | N1 or SG4 |
| | 2500–4096 | Empty space | |
| 2 | 1–4096 | SG1 | data |
| 3 | 1–4096 | SG2 | data |
| 4 | 1–4096 | SG3 | data |
| 5 | 1–4096 | N1 or SG4 | data |
| 6 | 1–4096 | SG1 | data |
| 7 | 1–4096 | SG2 | data |
| 8 | 1–4096 | SG3 | data |
| 9 | 1–4096 | N1 or SG4 | data |

Data from the tape can be read into ISPP using the input mode or using the strain-gage classifier type option in the process mode.

To use ISPP input mode, NBEG, the beginning data sequence number, NUMB, the number of contiguous sequences to input, NSKP, the number of contiguous sequences to skip and, NREP, the number of repititions must be input. The ISPP users manual is incorporated herein by reference for the description of data retrieved from this system.

To use the strain-gage classifier tape option only one strain-gage data block is read in at a time. The strain-gage number and the block number are the only input necessary.

As described above, the system of FIG. 3 is capable of first level identification of blade flutter, surge and rotating stalls and blade tip rub conditions immediately by their associated strain gage signals. However, the other aeromechanical phenomena listed in Table 1 are distributed both spatially and temporally. To best match this physical situation a three level classification algorithm has been developed. The first level is the individual strain-gage classification level. Each strain gage is processed independently using global features extracted from its vibration signal. No explicit structural or operational information is used at this level. The output of the first level is a set of pseudoprobabilities or quality values (Q) along with corresponding features for each of the aeromechanical phenomena. The Q values range from zero to unity, with zero indicating the strain-gage signal does not match the phenomenon, and unity indicating a perfect match. The output from the first level of c;classification of stored according to strain gage in an external file called the spatial file. The first level of classification is complete when all strain-gage results stored in the Spatial file are combined with compressor structural information and on-line operational information to produce event probabilities for the phenomena. The event probabilities are stored in the Event file 340.

The third level of classification is temporal combination. The event probabilities stored in the Event file 340 are combined with on-line operational information, off-line a priori information and data from other sensors to produce final or running probabilities for the phenomena. The final probabilities are reported to the operator and are updated after each event.

The first classification level is modular in structure. Each aeromechanical phenomenon to be detected has a corresponding category detection module. The independence of the category detection modules allows for straightforward addition of new modules or alteration of existing modules. The structure of individual modules is kept simple by the use of global features which are extracted outside the modules and are common to all the modules. The internal structure of the modules is thus limited to the computation of a few, if any, module specific features together with simple inferential (If, Then, Else) or relational (And, Or. Greater-than) statements.

The computation of probabilities at all three classification levels is accomplished using soft decision logic. Most of the features upon which the probabilities are computed have finite precision, including those features ordinarilly thought of as being binary (present or not present). For example, integral-order is a commonly used binary feature to differentiate resonance and flutter phenomena. However, a strict binary decision is not advisable because the accuracy of the integral-order computation is limited by the time-bandwidth product of the measurement and the uncertainty introduced by the nonstationarity of the phenomenon over the measurement interval. All features, binary of continuous, have a nominal value which is considered ideal for the phenomenon in question. Any deviation from the nominal value should be penalized such that the probability of the phenomenon is degraded. Without degradation logic a binary decision would result in a Q value of zero if the required feature were "absent" even though the feature was close to being present. With degradation logic the Q value determination is softened to allow for a margin of error.

The algorithm used for Q value determination is, $$Q = \mathrm{MAX}\left(0., 1.0 - \sum_{i=1}^{N} W_i d_i / \sum_{i=1}^{N} W_i\right) \tag{1}$$

$$d_i = \left(\frac{\mathrm{error}_i}{D_i}\right)^{e_i}$$

$$\mathrm{error}_i = \begin{cases} -\mathrm{MIN}(0., F_i - FN_i) & \text{if Mode} = -1 \\ |F_i - FN_i| & \text{if Mode} = 0 \\ \mathrm{MAX}(0., F_i - FN_i) & \text{if Mode} = 1 \end{cases}$$

where:

n=number of features
$W_i$=weight of ith feature
$d_i$=degradation due to ith feature
$D_i$=normalization divisor for feature i error
$e_i$=exponential degree for feature i error
$F_i$=actual value of ith feature
$FN_i$=nominal value of ith feature $$\mathrm{Mode} = \begin{cases} -1 \text{ to penalize only if } F_i < FN_i \\ 0 \text{ to penalize if } F_i \neq FN_i \\ 1 \text{ to penalize only if } F_i > FN_i \end{cases}$$

A particular category detection module will use N features in the computation for the probability value Q. Each feature will have a nominal value representing either the ideal value or the expected value for that feature. In the case of binary features the nominal value is either 0 or 1. When the strain-gage signal is processed a numeric value for the feature $F_i$ is computed and compared to the nominal value $FN_i$. There are three modes for computing the error. For mode 0, any deviation of $F_i$ from $FN_i$ is treated as an error. For mode 1, only a deviation where $F_i$ exceeds $FN_i$ is treated as an error, otherwise the error is zero. For mode −1, only a deviation where $F_i$ is less than $FN_i$ is treated as an error, otherwise the error is zero. The error is normalized by the divisor $D_i$ so that it falls within the nominal rang of 0.0 to 1.0. The normalization step compensates for different units of measurement. The normalized error is raised to an exponent $e_i$ to realize a particular error criterion. A linear error criterion is realized with $e_i$ equal to 1. A quadratic error criterion, which penalizes large deviations more heavily than small deviations, is realized with $e_i$ equal to 2. The exponentiated normalized error for feature i is referred to as the degradation due to feature i. A weighing value $W_i$ associated with each feature is used to adjust the relative importance of the feature. A weight of zero indicates that the feature is not to be used in the determination of the probability.

A relative large value of $W_i$ indicates that the feature is critical.

The probability value Q is computed by subtracting from unity the ratio given by the sum of the weighted degradations divided by the sum of weight values. Ideally, if all the $d_i$ were in the range from 0. to 1., then Q would be in the range of 0 to 1. However the actual value of $d_i$ may exceed unity due to the open-ended range of the computed feature, thus giving a negative Q value. To prevent this, Q is limited to a minimum value of zero.

Perhaps the most critical step in the SG Classifier design is the the specification of the feature set. If the feature set is flawed or incomplete then the classifier will yield poor results. The specifications of the feature set must take into account three requirements.

(1) the feature set must be complete, (2) qualitative features must be quantified, (3) redundant features must be eliminated.

The feature set is assembled by studying a table of characteristics, such as Table 1, and formulating appropriate deterministic or statistical measures for each characteristic. Often a characteristic is defined in qualitative terms such as "sinusoidal." In these cases, a mathematical equivalent to the qualitative description must be developed. Lastly, to prevent the classifier from being biased toward particular characteristics, redundant features must be eliminated. For example, if two features were 100% correlated, then the equation for the category probability indicates that the same probability could be obtained by using one of the features and doubling the feature weight. Now if the features were in fact dependent, the net result would be to erroneously weight the feature at twice its importance.

The characteristics of the aeromechanical phenomena given in Table 1 can be divided into three groups: individual strain-gage characteristics, spatial characteristics and temporal characteristics. The individual characteristics include integral order determination, sinusoidal purity, number of frequency peaks and amplitude behavior. The spatial characteristics include phase coherence, interblade involvement and interstage involvement. The temporal characteristics include speed dependence and syntactic relationships.

A vast assortment of numerical and statistical measures exist to quantify the above characteristics, such as correlation values, coherence functions, various transforms, modulation indices , probability density functions and various statistical moments. From these measures an infinite number of features can be defined. However to prevent feature redundancy and to minimize execution time, the SG Classifier feature set has been limited to:

(1) Stress features: Simple stress measures extracted directly from the strain-gage signal.

(2) FFT features: Frequency and phase information extracted from the complex Fourier transform of the strain-gage signal.

(3) Histogram features: Statistical measures of amplitude distribution.

Notably absent from the feature set are correlation and coherence functions. This information is either directly available from the above features or can be readily derived. A detailed description of the feature set is given in the Classifier Structure section.

The SG Classifier continuously monitors the incoming strain gage signals and processes these signals whenever either a stress threshold on an instrumented part is exceeded or a specified performance regime is entered. This latter monitoring mode is required to detect the onset of rotating stall or surge. Once a monitoring condition is reached, data is acquired from all strain gages, not just those exceeding threshold. The strain-gage data as well as tachometer data are input in digitized blocks of data via direct memory access to assigned memory locations in the SG Classifier's host computer of FIG. 3.

The data acquisition format is shown in FIG. 2. Each strain gage is coupled to dedicated signal conditioning and digitized hardware. The SG Classifier processes data in blocks of 4096 data points. The time interval of a data block is dependent on the sampling rate. The SG Classifier will accept any sampling rate, but practical limitations dictate a range from 1024 Hz to 25,600 Hz. The nominal sampling rate has been designated to be 5120 Hz. Table 4 lists the processing limitations associated with the various sampling rates.

TABLE 4

PROCESSING LIMITATIONS DUE TO SAMPLING RATE (Block Size = 4096)

| Rate | Sample Time T | Frequency Resolution DF | $f_{High}$ | Max EO Based on 12000 RPM |
|---|---|---|---|---|
| 1024 Hz | 4.0 secs | 0.25 Hz | 512 Hz | 2 |
| 5720 Hz | 8.0 secs | 1.25 Hz | 2560 Hz | 12 |
| 25600 Hz | 0.16 secs | 6.25 Hz | 12800 Hz | 60 |

At 5120 Hz, the 4096 point data block spans an interval of 0.8 secs, giving a frequency resolution of 1.25 Hz. The highest discernable frequency is 2560 Hz which corresponds to 12 engine orders at 12,000 rpm.

The maximum of 100 strain gages require a dedicated 400K words of random access memory in the host computer. For greatest speed the data blocks and tachometer signal should be transferred via direct memory access. Prior to processing, the data should be compensated by the appropriate scale factor to correct for gain attenuations during data acquisition.

The processing of the strain-gage data is illustrated by the data-flow diagram in FIG. 3. At a given point in time there are N strain-gage data blocks to be processed. The number N corresponds to the number of strain-gage sensors that have been instrumented, up to a maximum of 100. The index I denotes that strain gage I is currently being processed. The N data blocks, referred to as the event, are synchronized by the data acquisition system and are registered in time with respect to the tachometer pulse sequence. The SG Classifier computes engine speed and accurately determines a timing pulse for phase reference.

The classifier sequentially processes all N data blocks. For each data block a number of global features are computed and stored in the Spatial File. The data block along with the global features are then passed to the category detection modules. Each module computes a probability value Q which is the quality of fit of the data to the phenomenon being detected. The probability values and features from each module are stored in the Spatial File.

After all N data blocks comprising the event have been processed, the event probabilities are computed and stored in the Event File, the Spatial File is reinitialized and the classifier proceeds to the next event. As the processing of events continues, the probability of the currently active phenomenon will grow to near unity, while the probabilities of the other phenomena will decay to small values. At this time either a manual or automatic procedure can be invoked to take corrective action.

The SG Classifier is a generic classifier applicable to all compressors. All information regarding the particular compressor being tested and its associated instrumentation is contained in an external file referred to as the SG File. The SG File also stores intermediate processing results from the SG Classifier. Because of the high degree of interaction between the SG Classifier and the SG File the latter must be a random access file with an efficient data base management system for storing, retrieving and altering the data. A tree type data structure was developed to meet the SG File requirements.

Figure 13A:
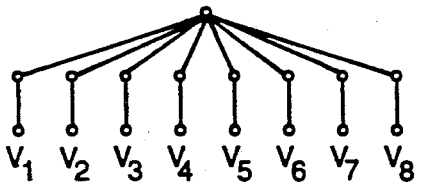
FIGS. 13A and 13B all illustrations of basic data tree structures.

Two tree structures representing minimum and maximum storage overhead are shown in FIG. 13. Each tree is composed of intermediate nodes and terminal nodes. The system of FIG. 13A has all of the values ($V_1$–$V_8$) of the individual sensors (at the terminal nodes) read into the SG file with one level of intermediate nodes there between. In other words, the system of FIG. 13A has the basic tree structure given below in Table 5.

TABLE 5 l=NUMBER OF LEVEL=1
N=TOTAL FILE ENTRIES=16
M=NUMBER OF VALUES=8
OVERHEAD FACTOR=N/M=2

Figure 13B:
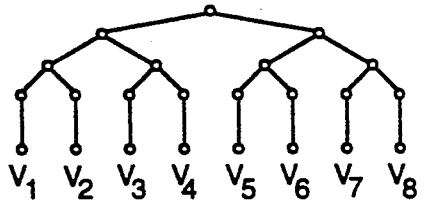

The system of FIG. 13B has a tree structure with three levels, and has the characteristics listed below in Table 6.

TABLE 6 l=NUMBER OF LEVEL=3
N=TOTAL FILE ENTRIES=3M−2=22
M=NUMBER OF VALUES=2=8
OVERHEAD FACTOR=N/M=2.75

Figure 14:
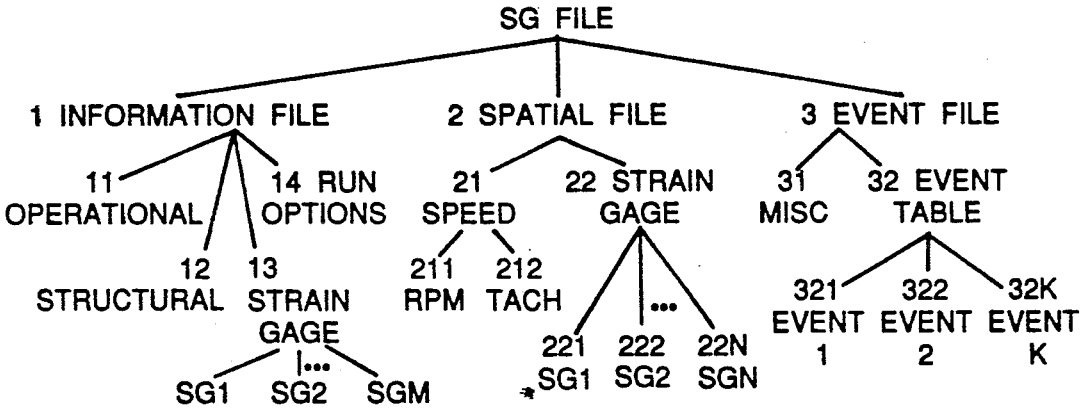
FIG. 14 is a chart of the strain gage file structure, as stored in the system memory.

The actual data values in the SF File are stored as the terminal nodes. The intermediate nodes contain pointers to successor nodes and represent file overhead. The maximum depth of the SG File has been set to 8 nodes. The size of the SG File including overhead is from 2 to 3 times the number of data values contained within. The minimum overhead case, illustrated in FIG. 13, occurs for a one-level tree. This is a trivial case which defeats the advantages of a tree structure. The maximum overhead case occurs when all nodes branch into two successors giving a binary tree structure as shown in FIG. 14. The number of values in the binary tree is $M=2^l$ where l is the number of levels, excluding the root level. The total number of nodes in the tree is 3M−2, excluding the root node. For a large binary tree, M || 1 and the ratio of nodes to values approaches the maximum value of 3. A typical tree structure will have an overhead of about 2.5.

Data in the SG File is accessed by specifying the tree address of the data, as opposed to the actual file address of the data. An example of a simple tree structure showing tree addresses and the corresponding file structure is as follows. Six data values are stored in the tree (in this case the tree storage overhead is 2.5). The tree address of any data value is easily determined by noting the branch number at teach tree level required to reach the data value. The sequence of branch numbers is the tree address of the data value. For example, to reach data value $V_D$, one must follow branch 1 from level o, branch 3 from level 1 and branch 2 from level 2; thus giving a tree address of 1,3,2 for $V_D$. The actual file address of $V_D$ is location 11. The location of $V_D$ in the file is found by using the tree address indices as relative addresses into the file. For example, the file address is initially 1; adding the first tree address index of 1, and subtracting 1 gives a file address of 1, which contains the quantity 3. Now, because there are remaining tree address indices yet to be used, the algorithm treats the contents of file location 1 as a pointer into the file. The file address is updated to the pointer value of 3. Adding the next tree address index of 3 and subtracting 1 gives a file address of 5, which contains the quantity 8. Again, since there is one additional tree address index to be processed, the quantity 8 is taken to be a pointer and the file address is updated to the pointer value of 8. Adding the last index of 2 and subtracting 1 gives the file address 9. Since no additional tree address indices remain, the contents of file address 9, which is the value 11, is taken to be a pointer to the data value $V_D$. Thus $V_D$ is found at file address 11.

Although the above procedure is tedious to perform manually, it is efficiently performed automatically by the function SGFVAL which returns a data value given its tree address. For example,

VALUE−SGFVAL (IER, IADDR, 1,3,2,0,0,0,0,0)

returns the value $V_D$ in the variable VALUE and the file address of $V_D$ in the integer variable IADDR. If an error is encountered in tracing the tree address indices, then the IER integer variable will be set to the index at which the error was encountered.

For general data storage and retrieval the subroutines SGFPUT and SGFGET are used. These routines store or retrieve a contiguous sequence of data values at a specified SG File address. The SG File address is obtained using the SGFVAL function. For example,

CALL SGFPUT(SGFILE, IADDR, DATA, ND,
IPR, LENGTH)

will store the sequence of data values of length ND located in array DATA into the SGFILE starting at location IADDR. The data values are listed by setting IPR to unity. The dimension of SGFILE is specified in the argument LENGTH.

The construction of the SG File is accomplished in two steps. First the SG File Skeletal Structure is defined and then the data values are loaded. The skeletal structure is defined by specifying the number of branches at each tree node. This is accomplished using the subroutine SGFBLD, which interactively prompts the user for the required information on a node-by-node basis. The output of the SGFBLD subroutine is a functional SG File whose data values are initially all zero. The next step is to load the SG File with the desired data values using a succession of SGFVAL and SGFPUT subroutines. For efficiency it is recommended that the SGFVAL and SGFPUT subroutines be grouped into blocks which represent related information. An entire block can then be submitted in one step to load the corresponding portion of the SG File. This is especially convenient when switching between compressor types which may entail the changing of over one hundred parameters.

FIG. 14 is an illustration of the strain gage file structure used in the the present invention. The SG File has three major components, the Information file, the Spatial file and the Event file, as shown in FIG. 14. The Information file contains all operational and structural information that must be specified prior to SG Classifier operation. The Spatial and Event files store the intermediate processing results obtained during SG Classifier operation. The skeletal structure of the Spatial and Event files must be specified prior to operation. The detailed structure of the three files is defined below.

The Information file comprises the first branch of the SG File and is denoted by tree address 1,0 as shown in FIG. 14. The four major subdivisions of the Information file are denoted Operational, Structural, Strain Gage and Run Options, as detailed in FIGS. 15–19.

Figure 15:
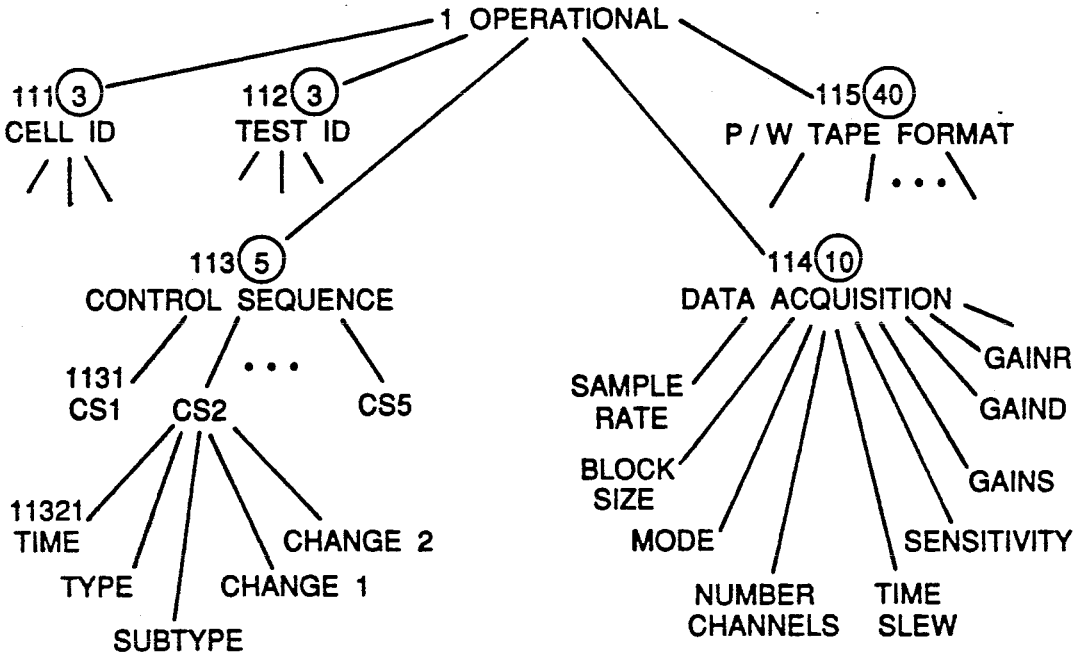
FIG. 15 is a chart of the information file operational subdivision, as stored in the system memory.

As shown in FIG. 15, the Operational subdivision contains test identification descriptors, control sequence timing information, data acquisition information and P/WA tape data base format information (used for classified development and not for final implementation). The address of each node is specified along with the number of branches at each node (the encircled quantity). There are 3 locations for cell identification, 3 for test identification, 5 for control sequences, 10 for data acquisition and 40 for tape format. The cell identification and test identification locations are for descriptive purposes and will be listed with SG Classifier output. Each of the control sequences contains the specification of a control change such as acceleration or vane positioning that occurs during the course of the compressor test. This information, if specified, is primarily for off-line postprocessing of strain gage data, and is used to reconstruct the test scenario. For on-line processing the compressor control changes are input directly to the classifier as they occur. A control change specification consists of the time of occurrence, control type and subtype and the magnitude of the change. The data acquisition information consists of sampling rate, block size, coupling method, number of channels, time slew between channels, strain gage sensitivity and various gain values. The tape format information is supplied for classified development and refers to the typical strain gage data base contained on magnetic tape.

Figure 16:
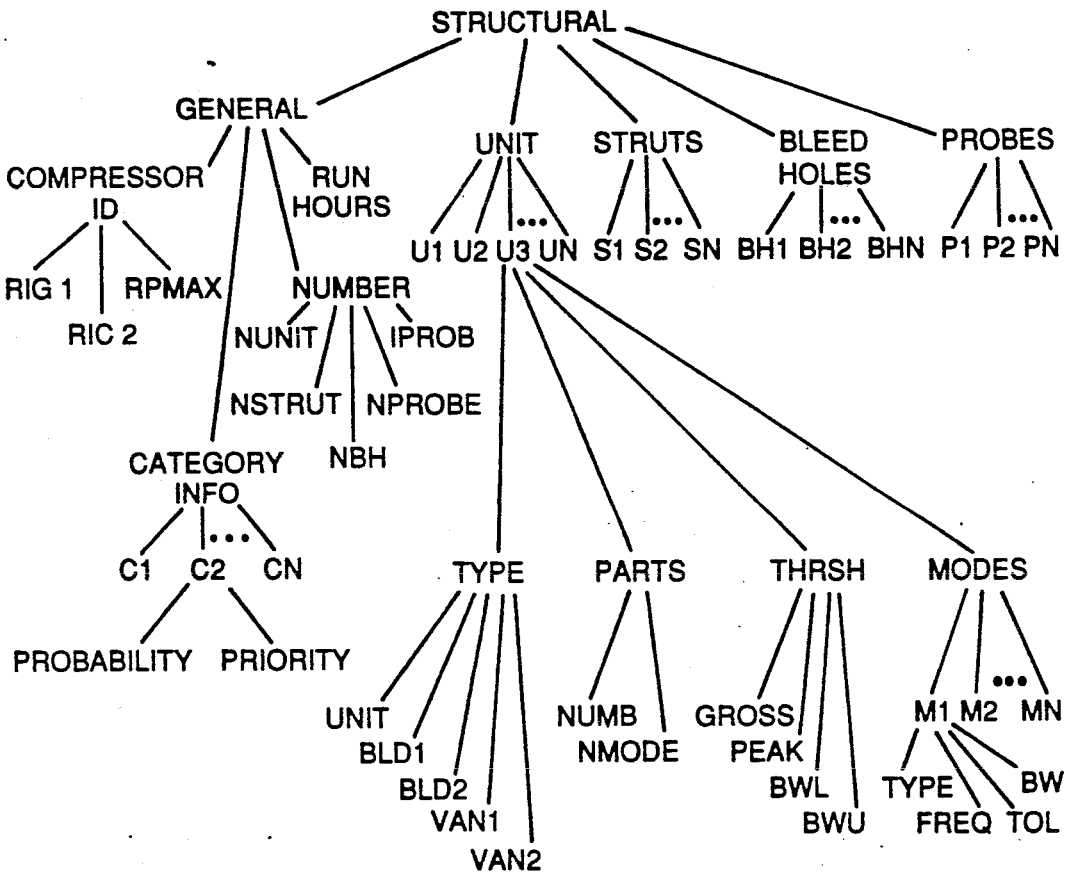
FIG. 16 is a chart of the structural subdivision of the information file.

The structural subdivision shown in FIG. 16 contains information specific to the compressor being tested including, compressor identification, accumulated run hours, known problems, number of rotating and nonrotating members, number of struts, bleed holes and auxiliary instrumentation probes, stress thresholds and natural frequencies of the compressor components. This information is specified with respect to a generic compressor structure shown in FIG. 22. The generic structure is define din terms of rotor or stator units starting at the front of the compressor. The unit specification is more general than the usual rotor/stator stage specification, and allows for cases where two or more stators precede a rotor.

The compressor identification information includes compressor type, subtype, maximum RPM and other limit value. The probability and priority information permits known problems to be identified to the classified on a category by category basis. For example, if a particular compressor was prone to stall, then the the initial probability of the rotating stall and surge categories could be increased. For each compressor unit the information specified includes unit type (rotor or stator), blade or vane type (such as axial or circumferential dovetail), number of parts per unit, various threshold values for the part and mode information (bending or torsional, nominal frequency, frequency tolerance and bandwidth). The remainder of the Structural information consists of the number and location of all the struts, bleed holes and auxiliary probes.

Figure 17:
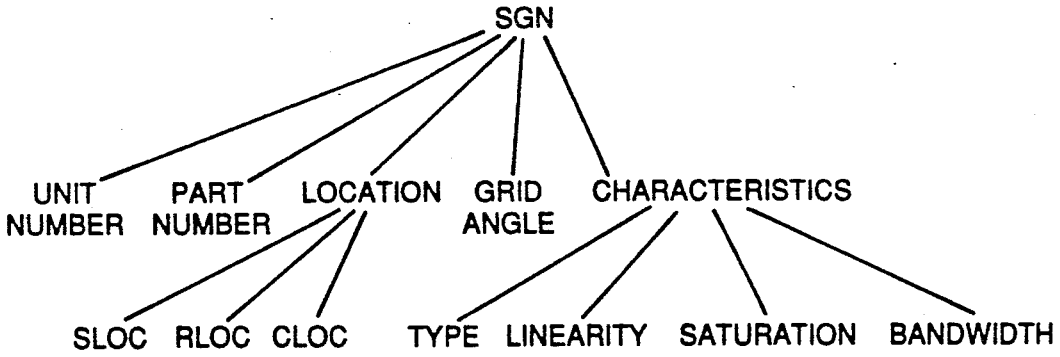
FIG. 17 is a chart of the strain gage subdivision of the information file.
Figure 23:
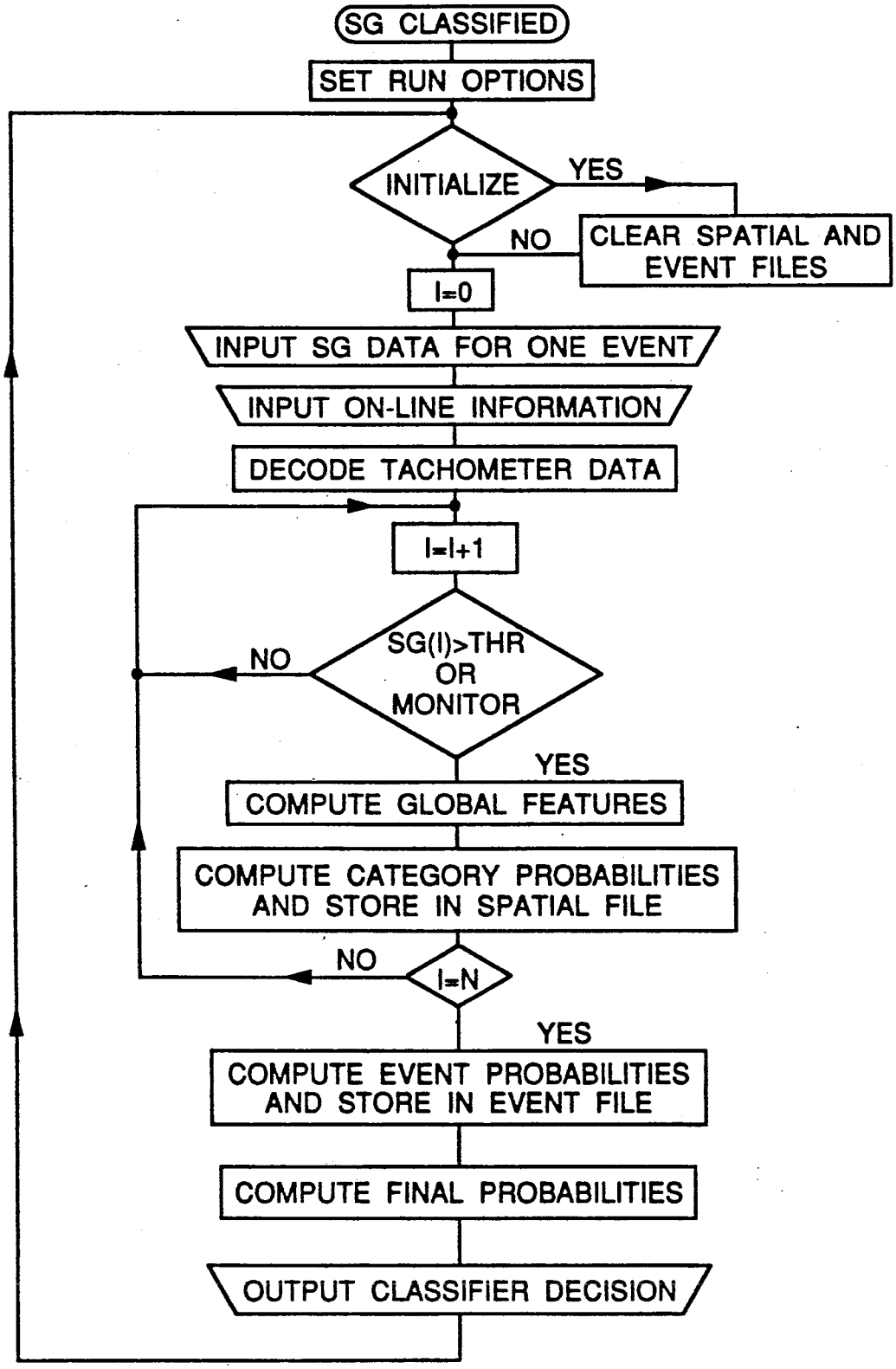
FIGS. 23 to 29 are flow charts used by the present invention.
Figure 24:
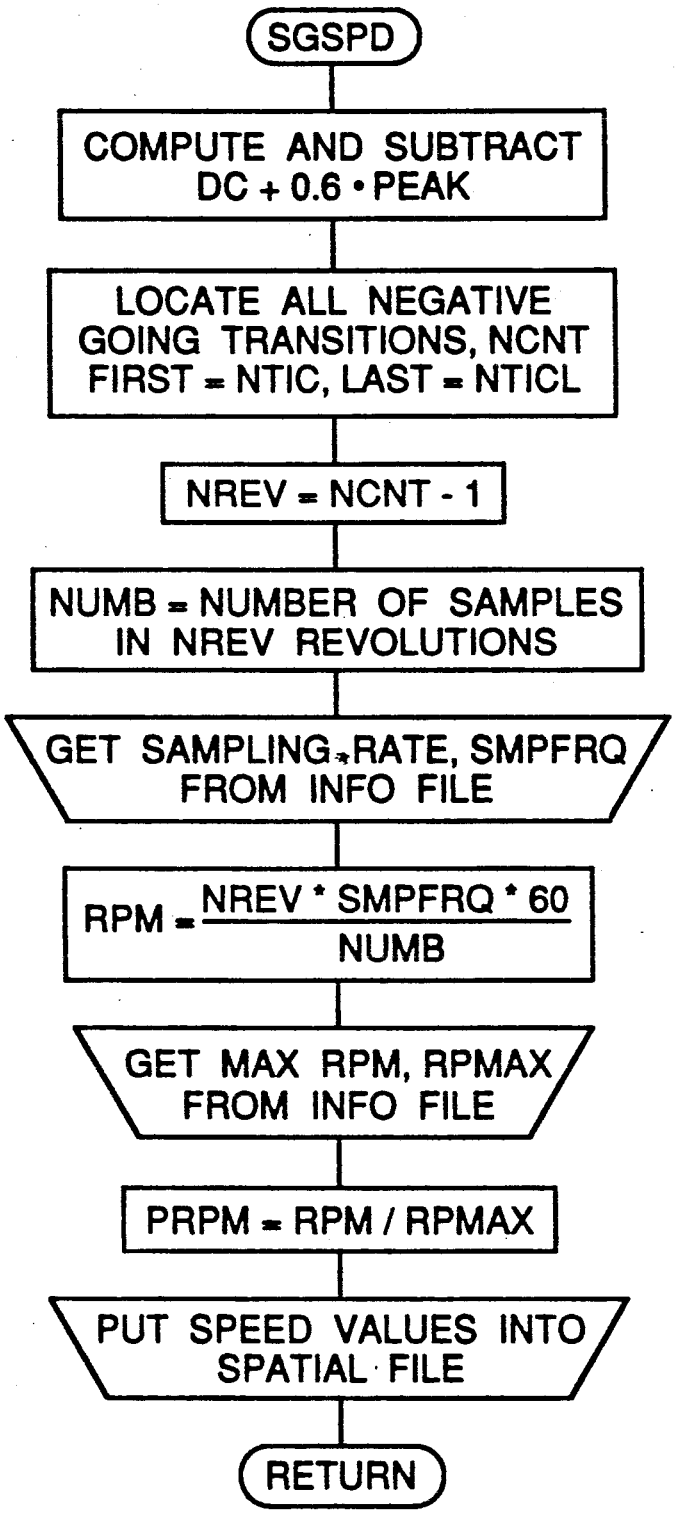

The Strain Gage subdivision shown in FIG. 17 contains identification and location information on every instrumented strain gage. As shown in FIGS. 23 and 24 the location information consists of the unit number, part number, location on the part and grid orientation. The location on the part is specified by surface location (convex or concave), radial location (root to tip) and chord location (leading to trailing edge). The grid orientation is important in determining the strain gages ability to measure bending versus torsional vibrations. The strain-gage identification includes type, linearity, staturation level and response band-width.

Figure 18:
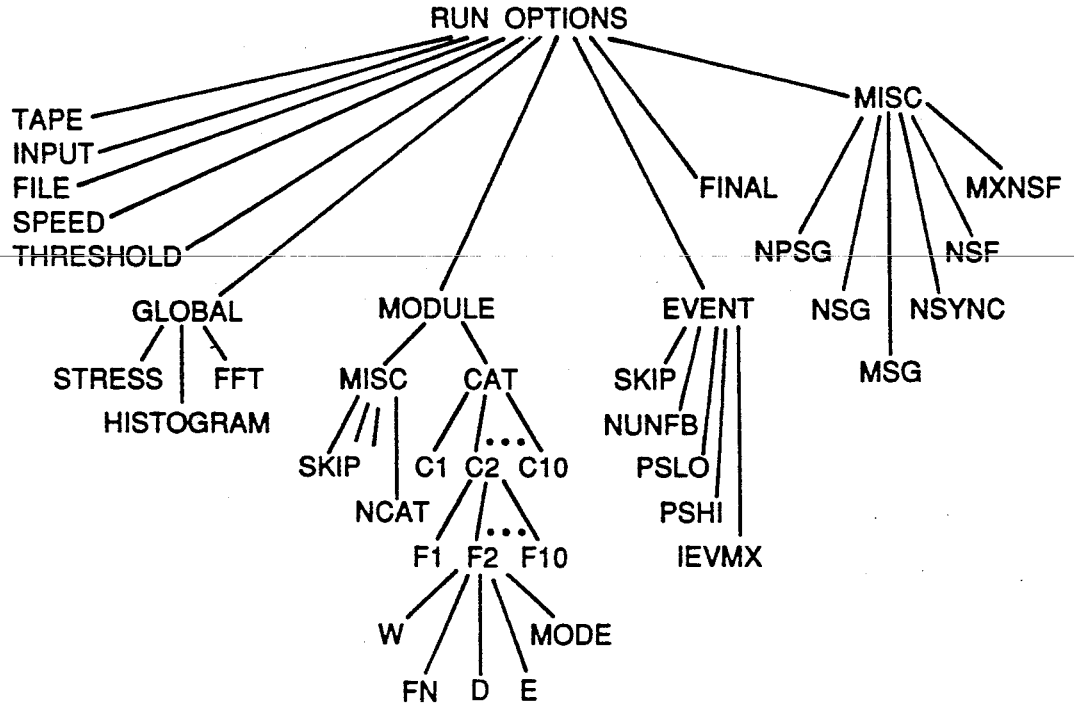
FIG. 18 is a chart of the run option subdivision of the information file.
Figure 19:
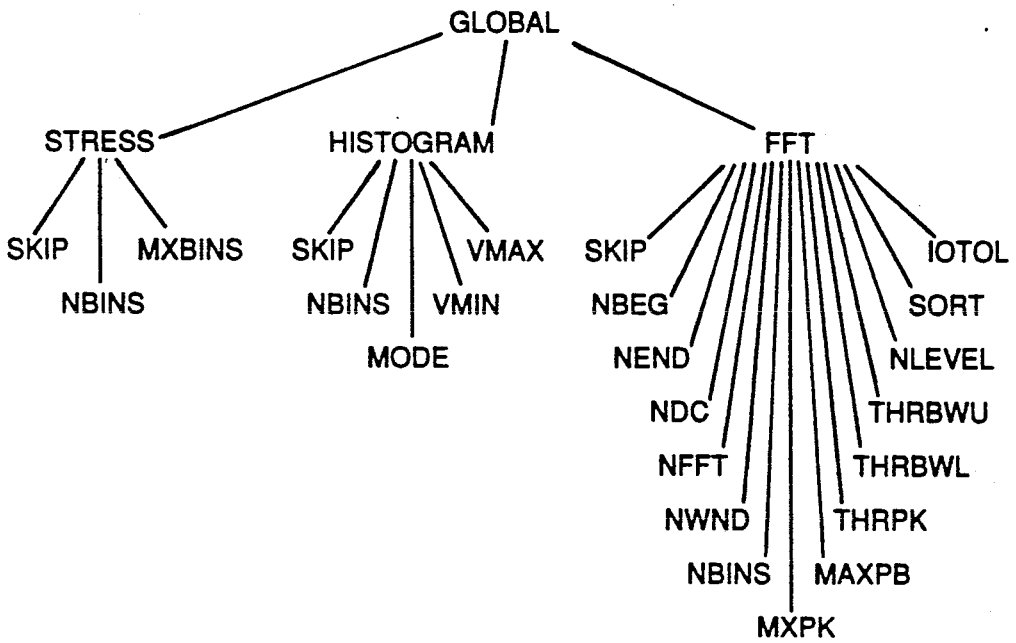
FIG. 19 is a chart of the global feature options.

The Run Options subdivision shown in FIGS. 18 and 19 contains all adjustable parameters which effect the operation of the classified. The subdivision is further divided into groups of parameters for each of the classifier subroutines. The various parameters offer a large degree of flexibility in the operation of the classified. Most of the parameters are of use primarily during the developmental stages of the classifier and would not need to be accessible in the final implementation. Specific information on the parameters will be given in the Classified Structure section.

Figure 20:
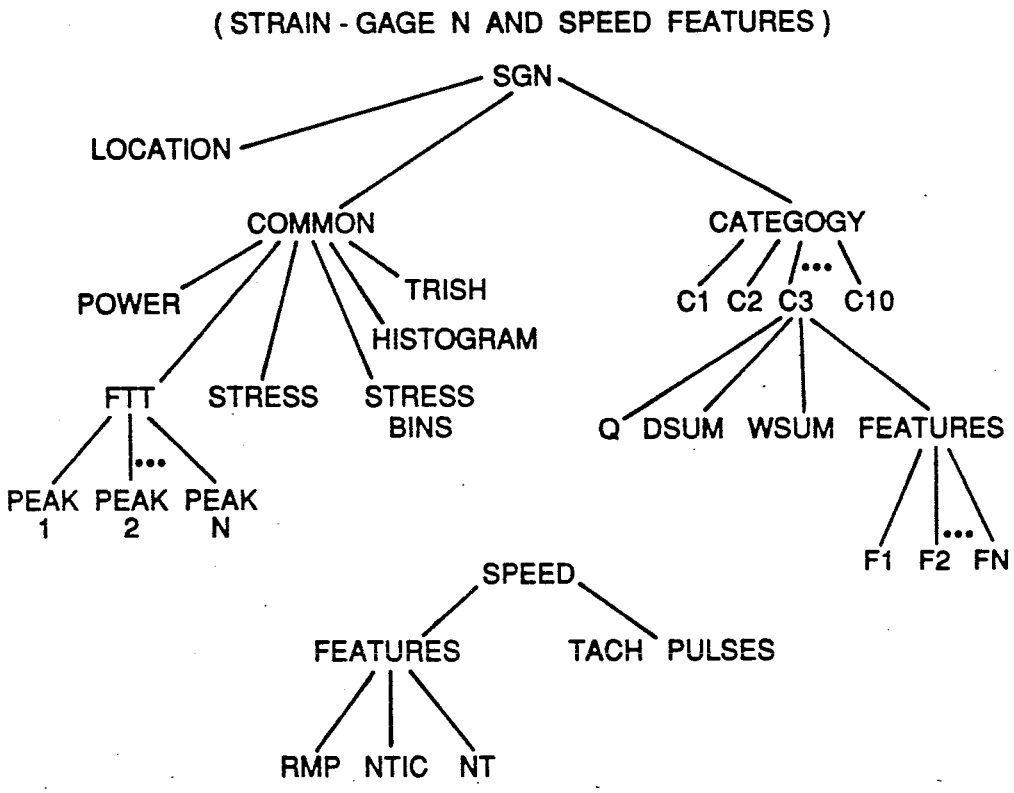
FIG. 20 is a chart of the spatial file as stored in the system memory.

The Spatial File shown in FIGS. 14 and 20 is the second branch of the SG File and is denoted by tree address 2,0. The Spatial File stores classified results from the tachometer and each of the strain gages within a single time interval. The tachometer data is processed by the classified resulting in compressor RPM and other speed related quantities which are stored in the left-hand branch of the Spatial File. The righthand branch contains three major subdivisions for each strain gage: Location information, Common information and Category information. The Location subdivision contains the same information for the strain gage as found in the Information file. This information is copied over when the strain-gage data block is processed. The Common subdivision contains all the global features extracted from the strain-gage data block including threshold features, stress features, histogram features and FFT features. The Category subdivision contains the processing results of all the category detection modules, namely the probability values and the extracted features. The contents of the Spatial File will be explained in more detail in the Classified Structure section.

Figure 21:
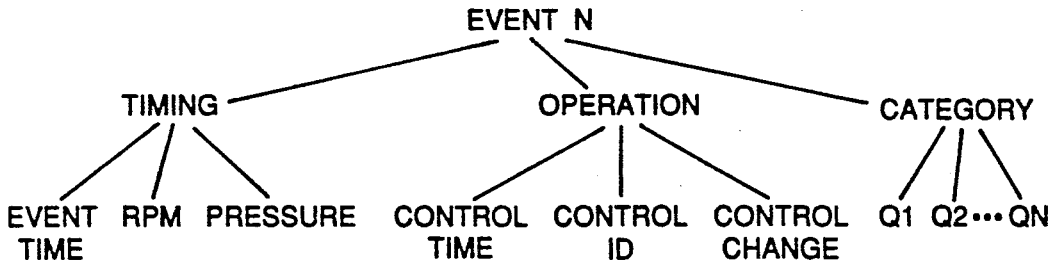
FIG. 21 is a chart of the event file as stored in the system memory.

The Event File shown in FIGS. 14 and 21 is the third branch of the SG File and is denoted by tree address 3,0. The Even File stores the classified results for each event. Recall that an event corresponds to the spatial combination of the individual strain-gage results stored in the Spatial File. The Event file contains three major subdivisions for each event: Timing information, Operational information and Category information. The Timing subdivision consists of the time the even occurred, engine speed, pressure ratios, etc. The Operational subdivision consists of the time of the last control input prior to the event, control identifiers and the magnitude of the control change. The Category subdivision consists of the computed probabilities for each of the vibration categories.

Figure 22:
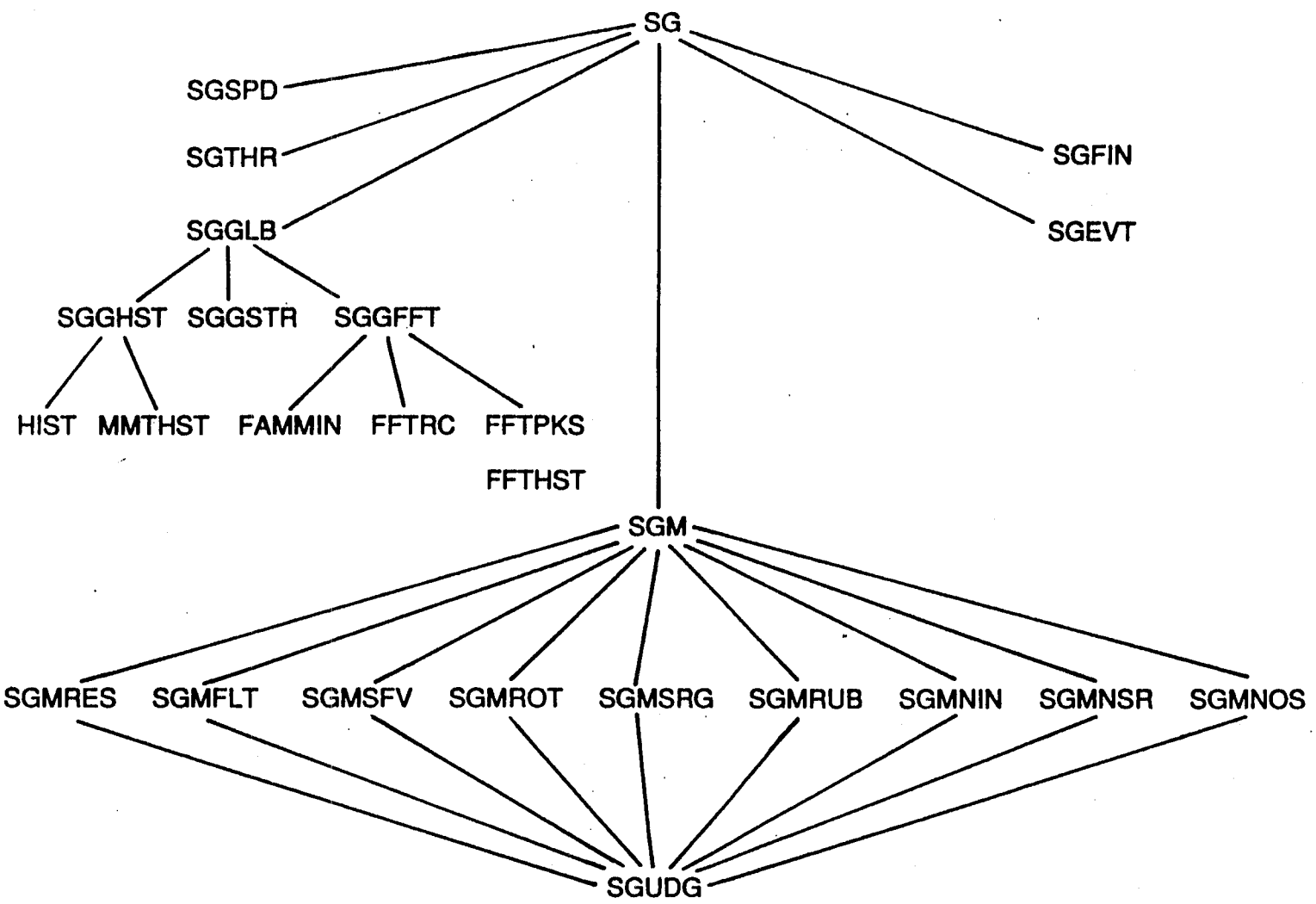
FIG. 22 is a chart of the strain gage classified structure.

The computational units of the SG Classifier are organized in a structured framework of subroutines diagrammed in FIG. 22. The leading subroutine SG calls the subroutines SGSPD, SGTHR, SGGLB, SGM, SGEVT and SGFIN, to perform the tasks of tachometer processing, data thresholding, global feature extraction, module probability determination, event probability determination and final probability determination. The SGGLB subroutine calls the subroutines SGGHST, SGGSTR and SGGFFT to compute histogram, stress and FFT global features respectively. The subroutines are independent and could be performed in parallel. The SGM subroutine calls the category subroutines SGMRES, SGMFLT, SGMSFV, SGMROT, SGMSRG, SGMRUB, SGMNIN, SGMNSR and SGMNOS for the detection of resonance, flutter, separated flow vibration, rotating stall, surge, rub, intermittent noise, slip ring noise and open-short noise respectively. These subroutines are also independent and could be performed in parallel. There is no explicit subroutine for detecting a misrigged vane. The problem is defined by its effects on other compressor stages and is detected in subroutine SGFIN. The following paragraphs specify in detail the parameters required, the computations performed and the output produced in each of the SG Classifier subroutines.

The flow diagram for subroutine SG given in FIG. 23 shows the functional steps involved in the computation of the category probabilities. Prior to running the SG Classifier the test engineer must supply the classifier with structural information as discussed previously in the SG File section, and must specify various classifier run options. The run options give the test engineer considerable flexibility in processing the strain gage data. This flexibility is primarily of use during classifier development but a number of the run options will also be included in the final implementation.

Classifier execution begins with the initialization of the Spatial and Event files which will contain the classifier processing results. Classifier results are computed using all information back to the last initialization time. For off-line classifier development the user is prompted for strain-gage data at every time epoch, at which time the user can elect to reinitialize the files. For on-line operation the user will not be prompted, but can invoke the initialization process at any time via an interrupt command.

For on-line operation the strain gage data for one event (4096 data points from each instrumented strain gage) is input via direct memory access into the SG Classifier memory. For off-line operation the data is input from magnetic tape via subroutines SGTAPE and SFINP. The time duration of the event will be from about 0.2 secs to 6 secs depending on the sampling rate. At the nominal 5120-Hz sampling rate the event will be 0.8 secs in duration. For on-line operation the SG Classifier will input directly all control and auxiliary sensor data. For off-line operation the SG Classifier will input this data from the Information file, assuming the data is available.

Engine speed and timing information is decoded in subroutine SGSPD using the tachometer pulse sequence that accompanies the strain-gage data. All of the strain-gage data for the event is referenced to the trailing edge of the first tachometer pulse, thus allowing phase relationships to be computed. Any time slew that may exist between the strain-gage data channels is assumed to be compensated prior to data input to the classifier.

The SG Classifier processes each strain-gage data block individually and stores the results in the Spatial file. The index I in FIG. 23 indicates the specific strain gage being processed. The data is first compared to the stress threshold corresponding to the blade or vane type, in subroutine SGTHR. If the data exceeds the threshold or if the classifier is in the monitor mode then the classifier computes global features in subroutine SGGLB and computes category probabilities in subroutine SGM.

After all N strain gages have been processed the classifier computes the event probabilities in subroutine SGEVT by combining the individual strain-gage probabilities with compressor structural information. The event probabilities are then stored in the Event file and the Spatial file is cleared to accept the next event. For on-line operation the final probabilities are computed by sub-routine SGFIN automatically as each event is processed by combining the event probabilities with on-line compressor operational information. For off-line operation the computation of the final probabilities is under user control. The single category decision or a complete listing of features and intermediate computations leading to the decision.

The flow diagram for subroutine SGSPD is given in FIG. 24. The subroutine requires the sample frequency (SMPFRQ) and the maximum compressor RPM (RPMAX), and computes the average RPM over the data block interval. In addition the percent RMPS (PRPM), the number of tachometer pulses (NCNT), and the locations of all tachometer pulses, including the first (NTIC) and last (NTICL), are computed.

Figure 25:
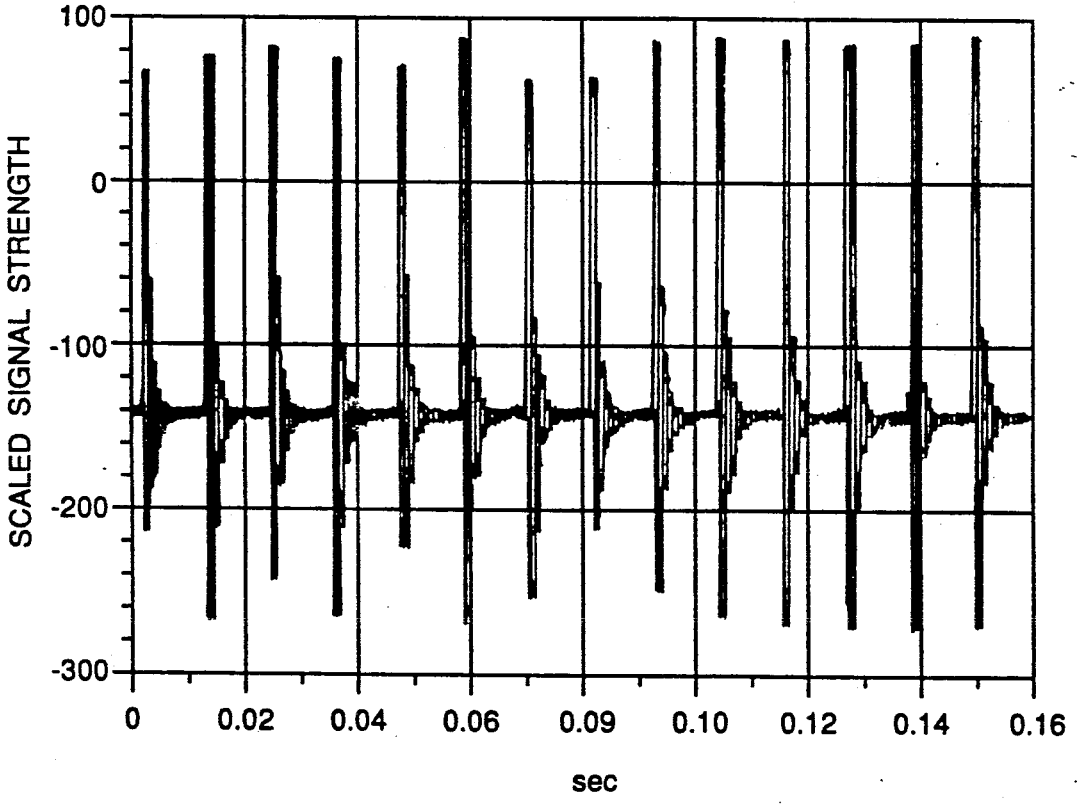

A typical tachometer signal is shown in FIG. 25. For noise immunity the SGSPD subroutine computes and subtracts the DC-value plus 60% of the peak value from the signal, prior to locating negative going transitions. The RPM and PRPM are computed by $$RPM = NREV*SMPFRQ*60/NUMB$$
$$PRPM = RPM/RPMAX$$

where

NREV = NCNT − 1

NUMB = Number of samples in NREV revolutions.

FIG. 24 gives the addresses in the SG File where the required parameters are obtained and the computed values are stored. For example the locations of all the tachometer pulses (up to 200) are stored in tree addresses 2,1,2,1,0 through 2,1,2,200,0.

Figure 26:
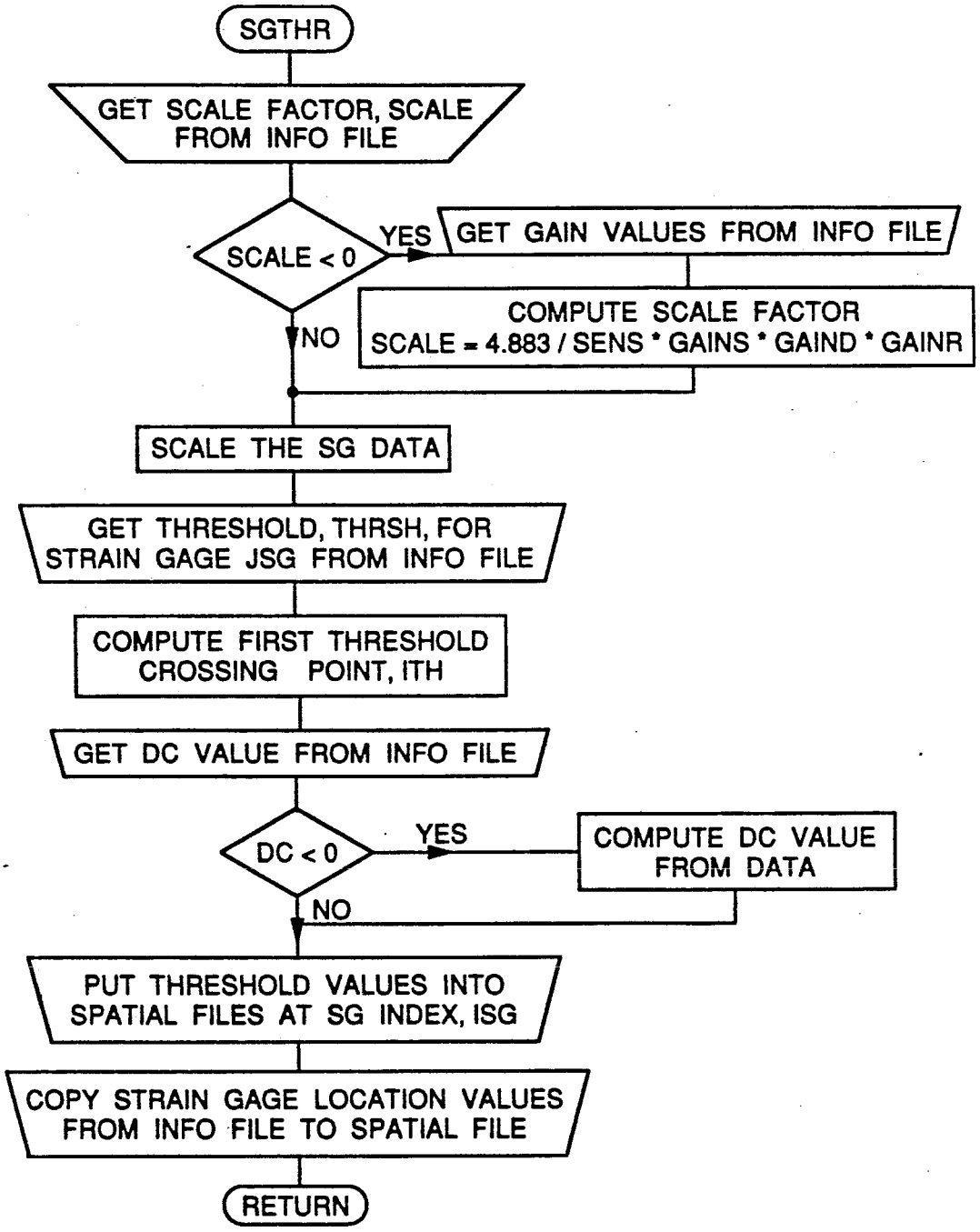

The flow diagram for subroutine SGTHR is given in FIG. 26. The subroutine requires several scaling parameters and a stress threshold value. The output includes a corrected strain-gage data block and the sample number at which the threshold value is exceeded (ITH). Several options exist for scaling the input data: no scaling, multiplication by a given scale factor, and multiplication by a computed scale factor based upon data acquisition gain values available in the SG File. The latter method is used in correcting the off-line tape data stress units to units of PSI. An option also exists to compute and subtract the average stress level.

The threshold value is dependent on the compressor unit on which the strain gage is instrumented. This provides flexibility in specifying different thresholds for different blade and vane types. The corrected strain-gage data is compared to the threshold value and ITH is set ot the sample number at which the threshold is first exceeded. If the data does not exceed threshold, then ITH is set to zero. The SG Classifier has a run option (tree address 1,4,5,4,0) which governs whether threshold exceedance is required before the data is processed further. In the monitor mode this run option is set to unity allowing all strain-gage data to be processed regardless of threshold exceedance.

Figure 27:
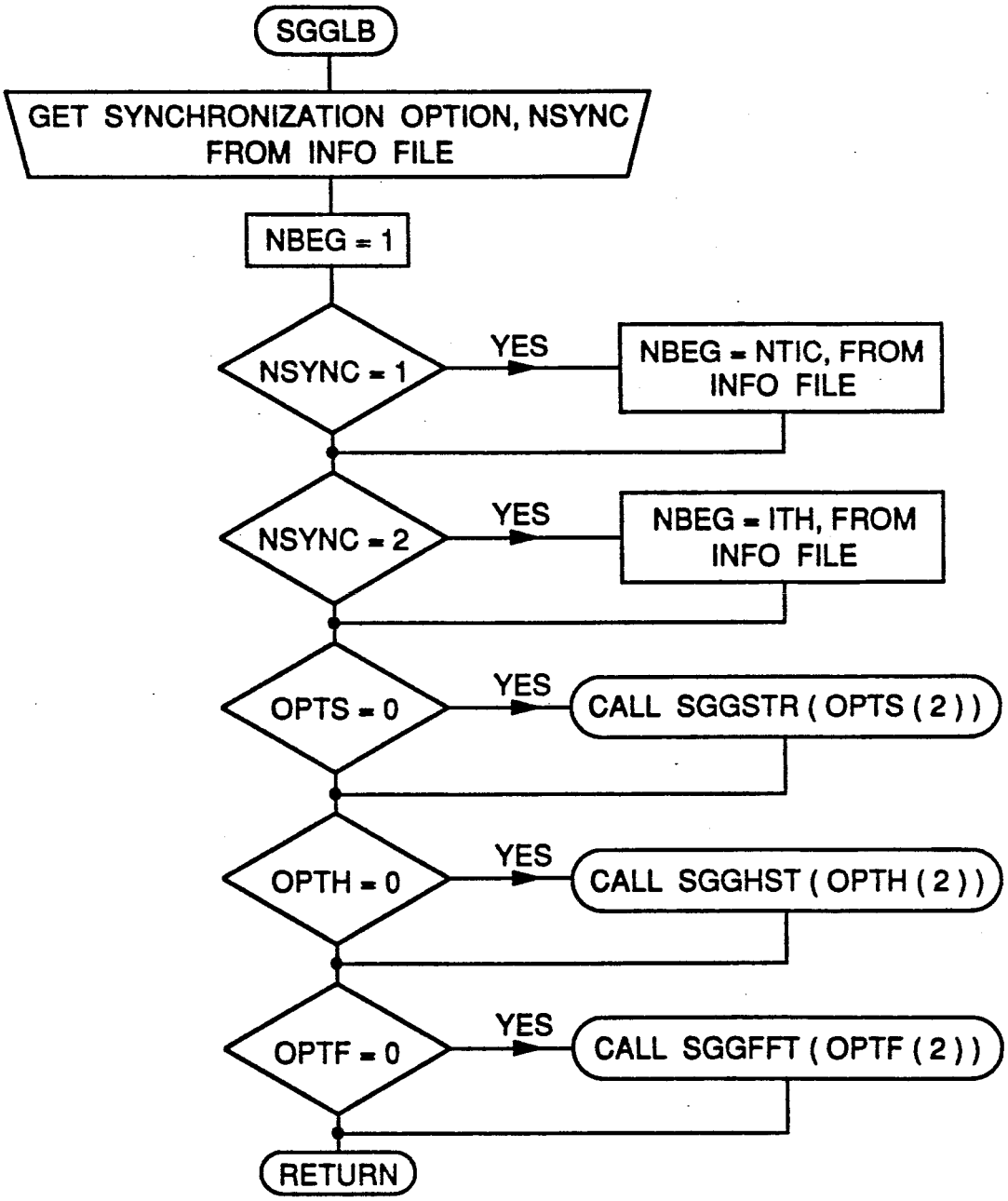

The flow diagram for subroutine SGGLB is given in FIG. 27. The subroutine requires several synchronization parameters (NSYNC, NTIC and ITH) and several feature extraction flags (OPTS, OPTH and OPTF). The function of the SGGLB subroutine is to call the three global feature extraction subroutines SGGSTR, SGGHST and SGGFFT. The strain-gage data is synchronized under user option NSYNC to either the first data sample, the trailing edge of the first tachometer pulse (NITC) or the threshold exceedance sample (ITH) of the first strain gage to exceed threshold. The three feature extraction subroutines can be selectively disabled by setting the appropriate flag(s) to unity.

Figure 28:
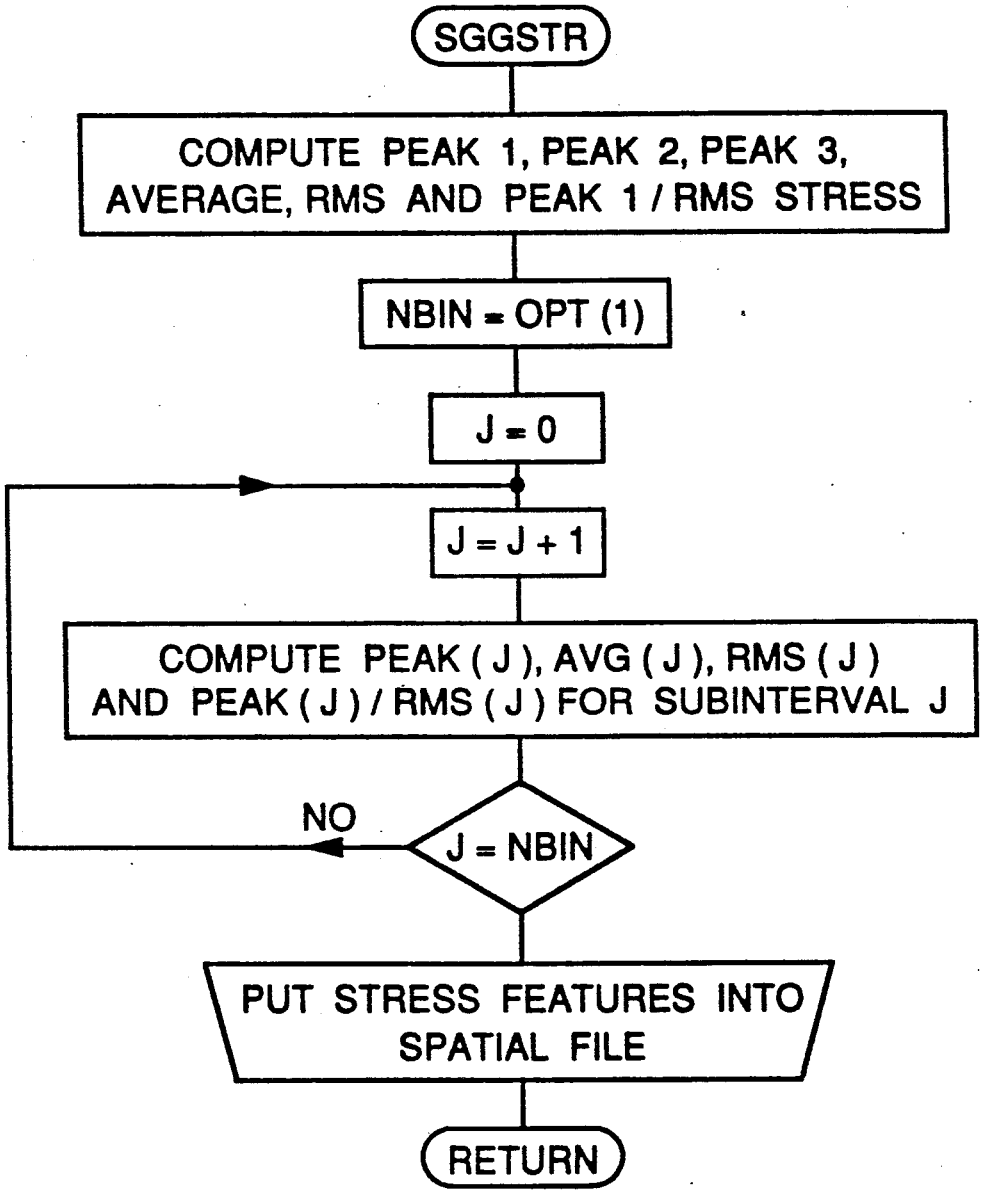

The SGGSTR subroutine (FIG. 28) extracts various stress features from the complete data block and from subintervals of the data block. The subroutine requires two parameters NBIN and MXBIN (see Table 5) which define the number of subintervals and the maximum allowable subintervals respectively. On the complete 4096 sample data block, SGGSTR locates the first three largest stress values (STRP, STR2, STR3) and their corresponding sample numbers (NTRP, NTR2 NTR3). The value STR3 is usually a more reliable value for peak stress than is STRP because the latter is more likely to be associated with a wild data point. SGGSTR also computes the average stress (STRA), the RMS stress (STRR), the peak block. The peak to RMS ratio is often used to discriminate sinusoidal from non sinusoidal signals. In the former case the ratio will have the value of 2. For a constant signal the ratio will be unity and for a random noise signal the ratio will be approximately 3 or above.

The length of the subintervals is determined by NPSG/NBINS where NPSG is nominally 4096. For each subinterval the peak stress (STRP), the RMS stress (STRR), the average stress (STRA) and the peak to RMS ratio (SINE) are computed. The variation of each of these values over the subintervals is then computed using, $$\text{variation} = \frac{\text{max value} - \text{min value}}{\text{max value}}.$$

The computed variations are stored in VARP, VARR, VARA and VARS respectively. The variation values are measures of the stationarity of the strain gage signal over the data block. A limit cycle phenomenon such as flutter will usually be stationary over the time interval represented by one data block (nominally 0.8 seconds), and will thus give a small variation value from 0 to 0.1. An impulse type phenomenon such as surge will produce large fluctuations in stress over the data block, giving a variation value from 0.8 to 1.0.

The gross stress features are stored in the spatial file in locations (2,2,ISG,2,3,1,0,0) to (2,3,ISG,2,3,14,0,0). The subinterval stress values are stored in the spatial file in locations (2,2,ISG,2,4,J,1,0), where ISG is the strain gage order number and J is the subinterval index.

Figure 29:
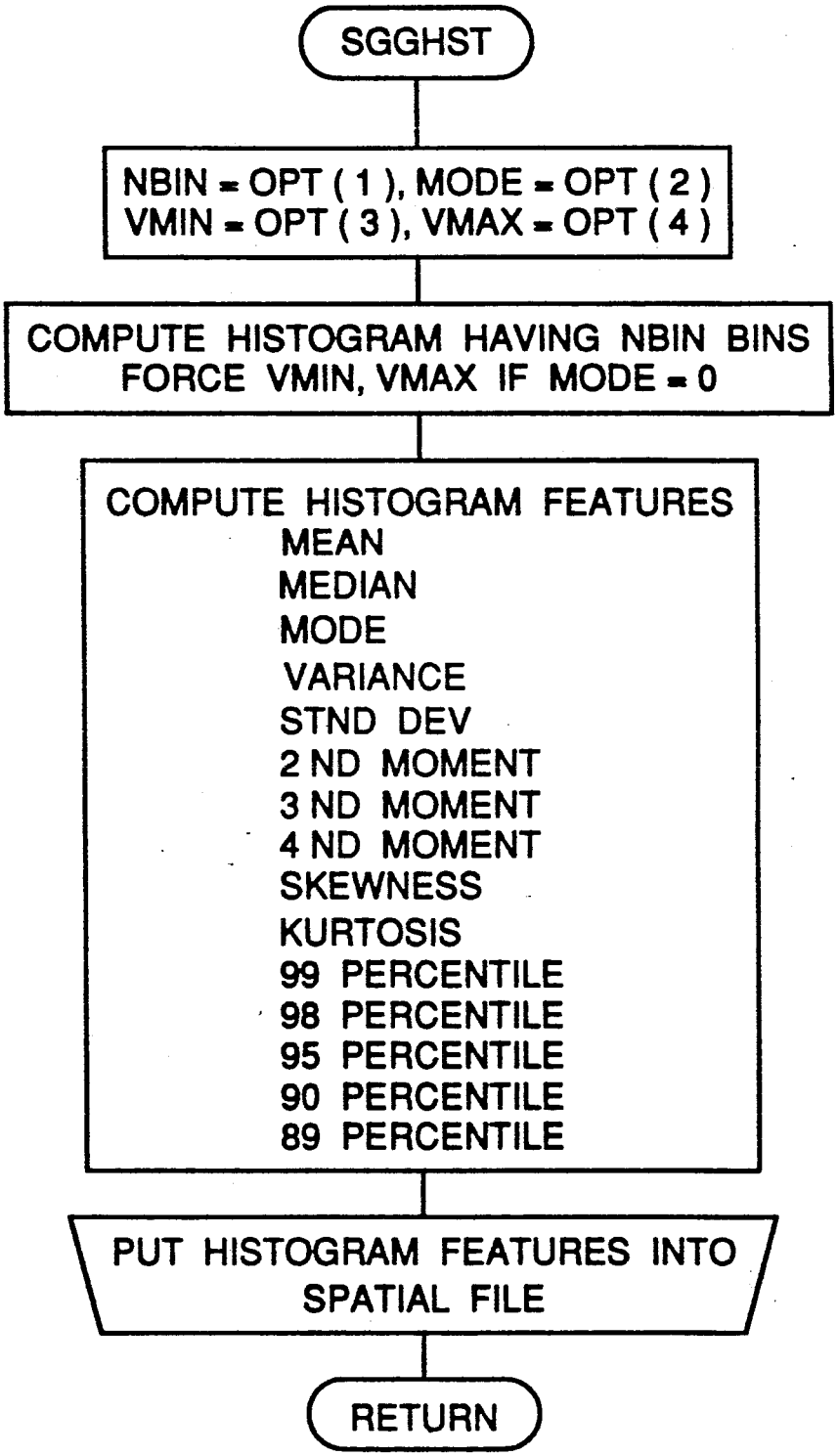
Figure 30:
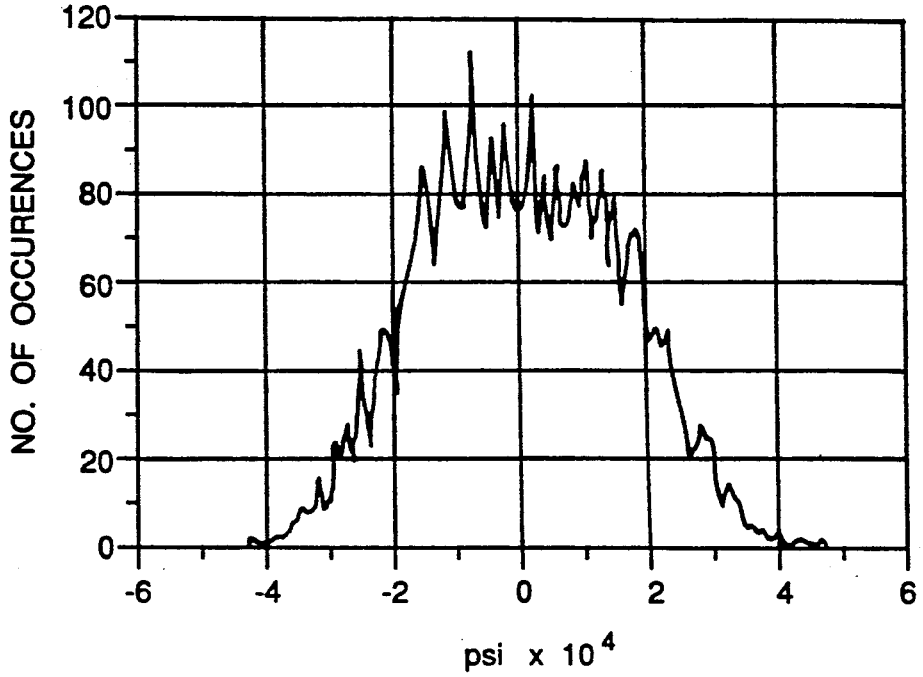
FIG. 30 is a chart of a typical histogram for a flutter condition.

The SGGHST subroutine (FIG. 29) extracts stress probability density features from the histogram of the data block. The subroutine requires four parameters NBIN, MODE, VMIN and VMAX (see Table 6B) which define the number of abscissa intervals (bins) and the domain of the abscissa (stress axis) on the histogram. For MODE=0 the SGGHST subroutine determines the minimum and maximum stress values in the data block and uses these values to define the histogram. For MODE=1 the VMIN and VMAX values supplied in the Information file will be used. This latter option insures uniformity between histograms from different data blocks for comparison purposes. The number of histogram bins (NBIN) determines the coarseness of the histogram. Too few bins corresponds to heavy smoothing which obscures the fine structure of the underlying probability density function (PDF). Too many bins corresponds to little or no smoothing which gives a noisy estimate of the PDF. For the nominal 4096 samples per data block a satisfactory histogram is obtained for NBIN between 100 and 500.

Figure 31:
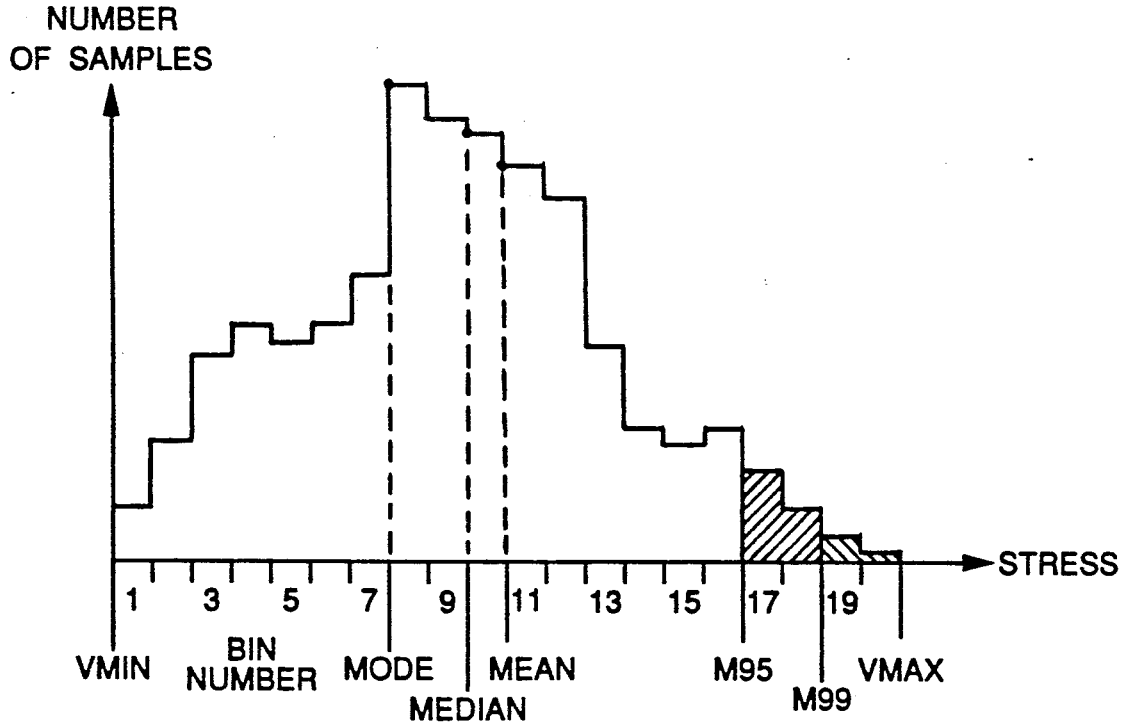
FIG. 31 is a chart of the features of a histogram.

The histogram is computed by subroutine HIST and the features are extracted by subroutine MMTHST. The shape of the histogram is used to discriminate deterministic phenomena from random phenomena. For example, certain noise signals give rise to skewed probability distributions. A typical histogram is shown in FIG. 31.

The features extracted from the histogram consist of the mean, median, mode, variance, standard deviation, second, third and fourth central moments, skewness, kurtosis and the 99th, 98th, 95th 90th and 80th percentiles. The normalized mean stress value is computed from the histogram by, $$MN = \sum_{J=1}^{NBIN} J*HIST(J)/NPSG$$

where NPSG is the total number of samples in the data block and HIST(J) is the number of stress values in bin J. The normalized mode is computed by, $$MD=J, \text{ where } HIST(J)>HIST(I) \text{ for all } I\neq J.$$

The second, third and fourth central moments are computed by, $$MC(K) = \sum_{J=1}^{NBIN} HIST(J)*(J - MN)**K/NPSG \text{ for } K = 2, 3, 4.$$

The variance and standard deviation are, $$VAR=NPSG*MC(2)/(NPSG-1)$$

$$SDV=VAR**0.5.$$

The skewness and kurtosis are computed by, $$SKW=MC(3)/MC(2)**1.5$$

$$KUR=MC(4)/MC(2)**2.$$

The median and percentile values are computed by $$PER(L) = K, \text{ so that } \sum_{J=1}^{K} HIST(J) = \frac{L*NPSG}{100} \text{ for } L = 50, 80, 90, 95, 98, 99$$

where the median value is PER(50).

The actual stress values are computed from the normalized features by, $$\text{VALUE} = \frac{VMAX - VMIN}{NBIN} * \text{Feature} + VMIN,$$

for the mean, median, mode and percentile values; and $$\text{VALUE} = \text{Feature} * \frac{VMAX - VMIN}{NBIN} ** K,$$

for the central moments. The skewness and kurtosis features are normalized quantities by definition and do not require correction. An example of histogram feature extraction is shown in FIG. 31.

The histogram features are stored in the spatial file in locations (2,3,ISG,2,5,1,0) to (2,2,ISG, 2,5,19,0).

The SGGFFT subroutine (FIG. 32) extracts frequency domain features from the magnitude of the FFT (periodogram) of the data block. The periodogram is an estimate of the power spectrum of the data block. Smoothing is generally required because the periodogram is not an efficient estimator.

The SGGFFT subroutine requires five parameters, NBEG, NEND, NDC, NFFT, and MWND (see Table 5). NBEG and NEND define the first and last data samples to be used in computing the FFT, thus providing the capability of computing the FFT over a particular subinterval of the data. NDC specifies that the average stress value shall be computed and subtracted from the data block prior to the FFT. NFFT specifies the length of the FFT as a power of TW. If NFFT exceeds the number of samples NUMB, equal to NEND-NBEG+1, then the remaining values will be zero-filled. IF NFFT is less than NUMB then NFFT is adjusted to the power of two greater than NUMB. This procedure permits the use of a computationally efficient power-of-two FFT algorithm. The MWND parameter specifies the window function which will be applied to the data block prior to the FFT. Data windowing is a procedure for reducing power spectrum estimation errors resulting from data truncation. Two window options are provided; MWND=1 selects the Hamming window and MWND=2 selects the Hanning window. After applying the above parameters the complex FFT of the data block is extracted, and the magnitude and phase sequences are computed.

Figure 32:
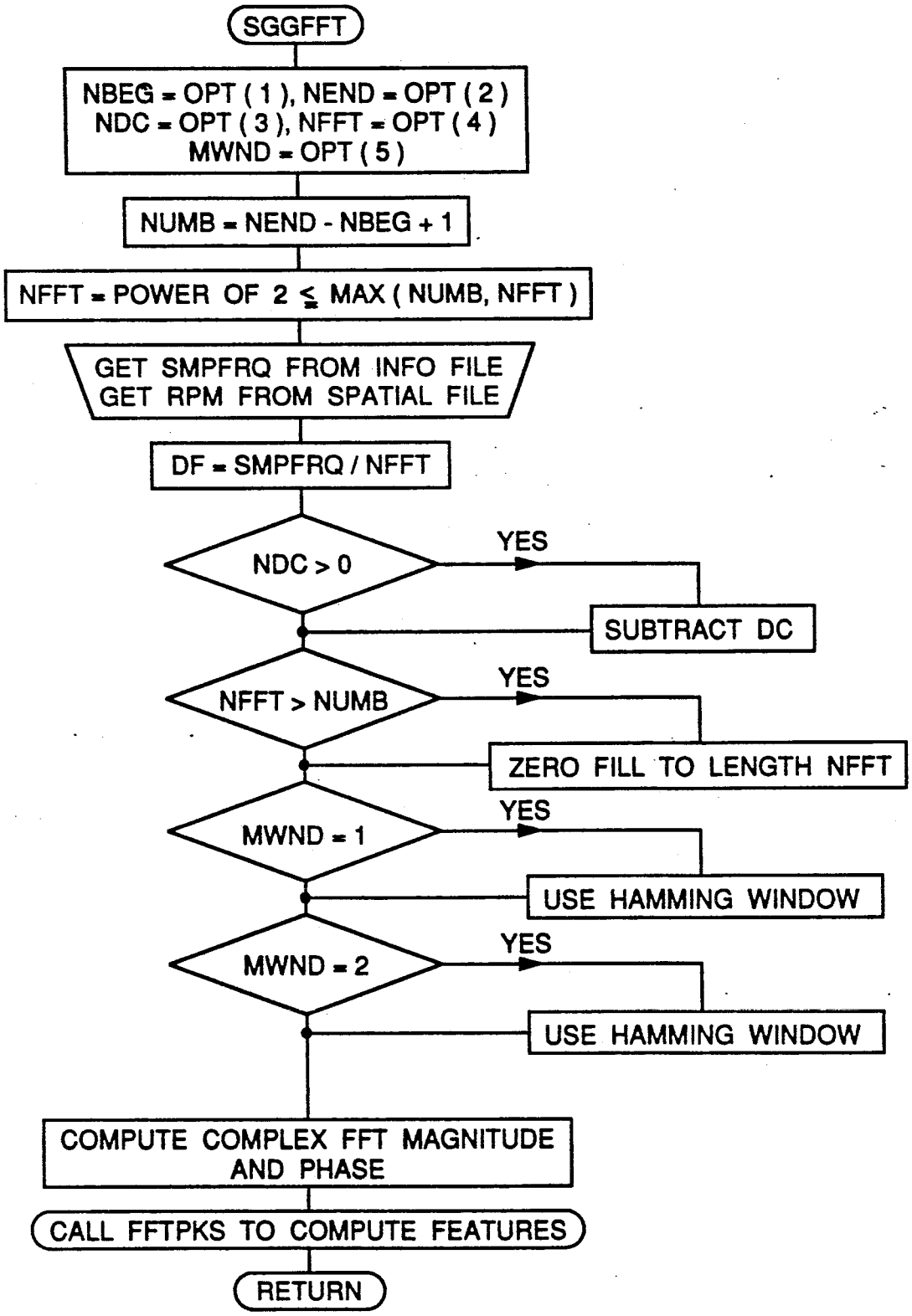
FIGS. 32–43 are flow charts of the decision-making logic used in the present invention.

The FFT features are extracted by subroutine FFTPKS shown in FIG. 32. The subroutine uses two parameters, NMBINS and PLEVEL, for a degree of automatic gain control on the extracted features. This is accomplished by computing all feature values relative to the noise power level of the data block. The noise power is estimated from the histogram of the power spectrum (periodogram) by noting that a typical power spectrum contains a broad-band noise level combined with a number of signal peaks. The histogram is an estimate of a Rayleigh-type distribution. Most of the frequency components will have a stress value in the noise level which is located toward the left on the histogram abscissa. The user can specify a percentile PLEVEL (typically 0.8 to 0.9) which defines the noise power threshold VNOIZ.

Two types of features are extracted from the FFT periodogram; gross features such as total power and noise power, and peak features which are particular to each spectral peak. The number of spectral peaks is determined by the peak threshold THRPK. THRPK can be specified either as an absolute level or relative to the noise power NOIZ. If multiple peaks are extracted they are ordered according to decreasing power content. The features extracted from each peak include the frequency, magnitude, phase, bandwidth, power, percent power, engine order and blade mode correspondence.

The feature NPK is the frequency sample number of the spectral peak, and FREQ is the corresponding frequency. VPK is the peak stress magnitude. VPHS is the phase associated with sample NPK and is determined by the phase sequence computed from the FFT. NWL is the lower band width of the peak expressed in samples, and is measured at stress threshold THRBWL. The threshold THRBWL can be specified either absolutely, relative to VNOIZ or relative to VPK. NWU is the upper bandwidth expressed in samples and is measured at stress threshold THRBWU, which is specified like THRBWL. APK is the sum of squares of stress values within the lower bandwidth NWL, and is a measure of the power at that particular frequency peak. SPK is the equivalent sinusoidal amplitude that would produce APK. EPK is the ratio of APK to the total sum of squares (TPOWER). RPK is the ratio of APK to the sum of power values for all the extracted spectral peaks. RACC is the cumulative power for the current and previous peaks with respect to the sum of all spectral peaks. EO is the engine order as determined by FREQ/RPS. IO is an integral order flag, and is nonzero only if FREQ is within a specified tolerance of an integral multiple of RPS; otherwise IO is zero and FERR is set to the error. IMODE is the mode number of the closest mode, and FMODE is the corresponding modal frequency. FMERR is the modal error in units of modal bandwidths, and is set to zero if FREQ is within one bandwidth of the nominal mode frequency. MTYPE is the type of modal vibration, such as bending or torsional. The gross power features are stored in Spatial file locations (2,2,ISG,2,1,1,0,0) to (2,2,ISG,2,1,9,0,00). The peak features are stored in locations (2,2,ISG,2,2,J,1,0) to (2,2,ISG,2,2,J,19,0) where J is the peak index.

Figure 33:
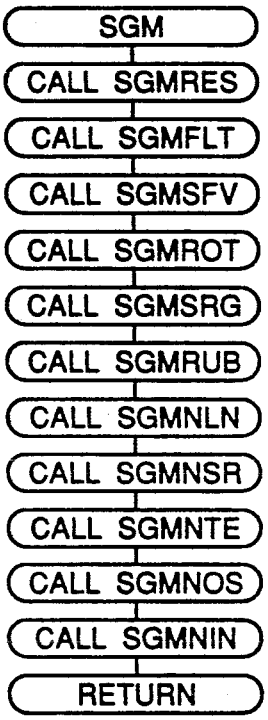

The SGM subroutine (FIG. 33) contains the category detection modules. The modules are executed sequentially in the order RES, FLT, SFV, ROT, SRG RUB, NIN NSR and NOS. The category detection modules are mutually independent and require only the strain-gage data block and the global features for inputs.

Figure 34:
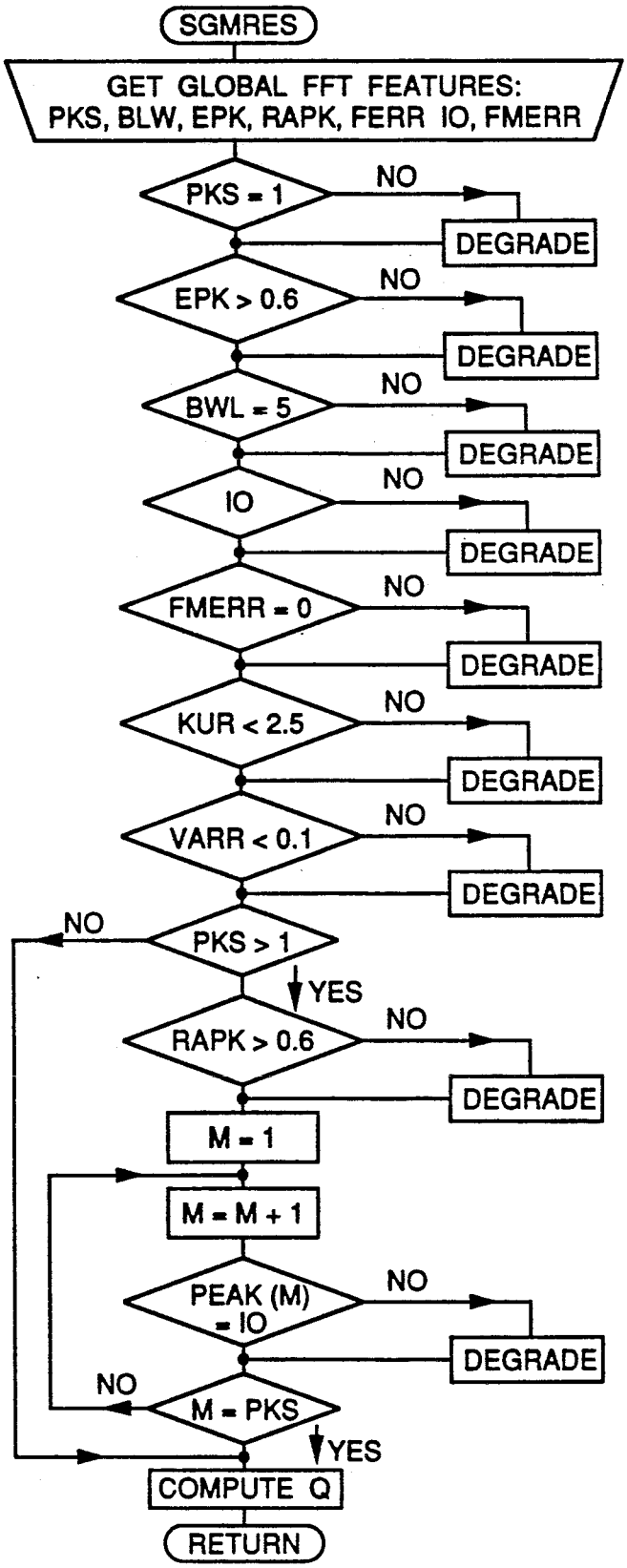

The SGMRES subroutine (FIG. 34) detects resonance phenomena. Recall from Table 1 that resonance is characterized by an integral order, sinusoidal vibration, usually corresponding to a single mode. However multimodal resonances do occur and must be accounted for. Similarly, a resonance mode can be excited by a subharmonic excitation in which case the vibration waveform will exhibit a regular modulation pattern characterized by subharmonic integral order frequencies.

The SGMRES subroutine requires the FFT global features, PKS, BWL, EPK, RAPK, FERR, IO and FMERR. The subroutine first checks the number of FFT peaks (PKS) and degrades the probability value Q if PKS is greater than 1. The largest energy peak (the only peak if PKS=1) is then examined for other resonance characteristics as follows. The peak must contain 50% or more of the vibration energy, must be integral order, must correspond to a blade mode and must have a bandwidth of one frequency resolution cell. The category Q is degraded if any of these conditions is not satisfied. For multiple peaks, the sum of the energies in the peaks (RAPK) must exceed 80% of the total energy, and all peaks must be integral order.

The amount of degradation contributed by a particular feature is governed by the degradation constants discussed in section 4.1.3. the nominal degradation constants for resonance are contained in the Information file starting at location (1,4,7,2,1,1,1,0). These values have been determined empirically and can be adjusted periodically as warranted by additional data.

Figure 35:
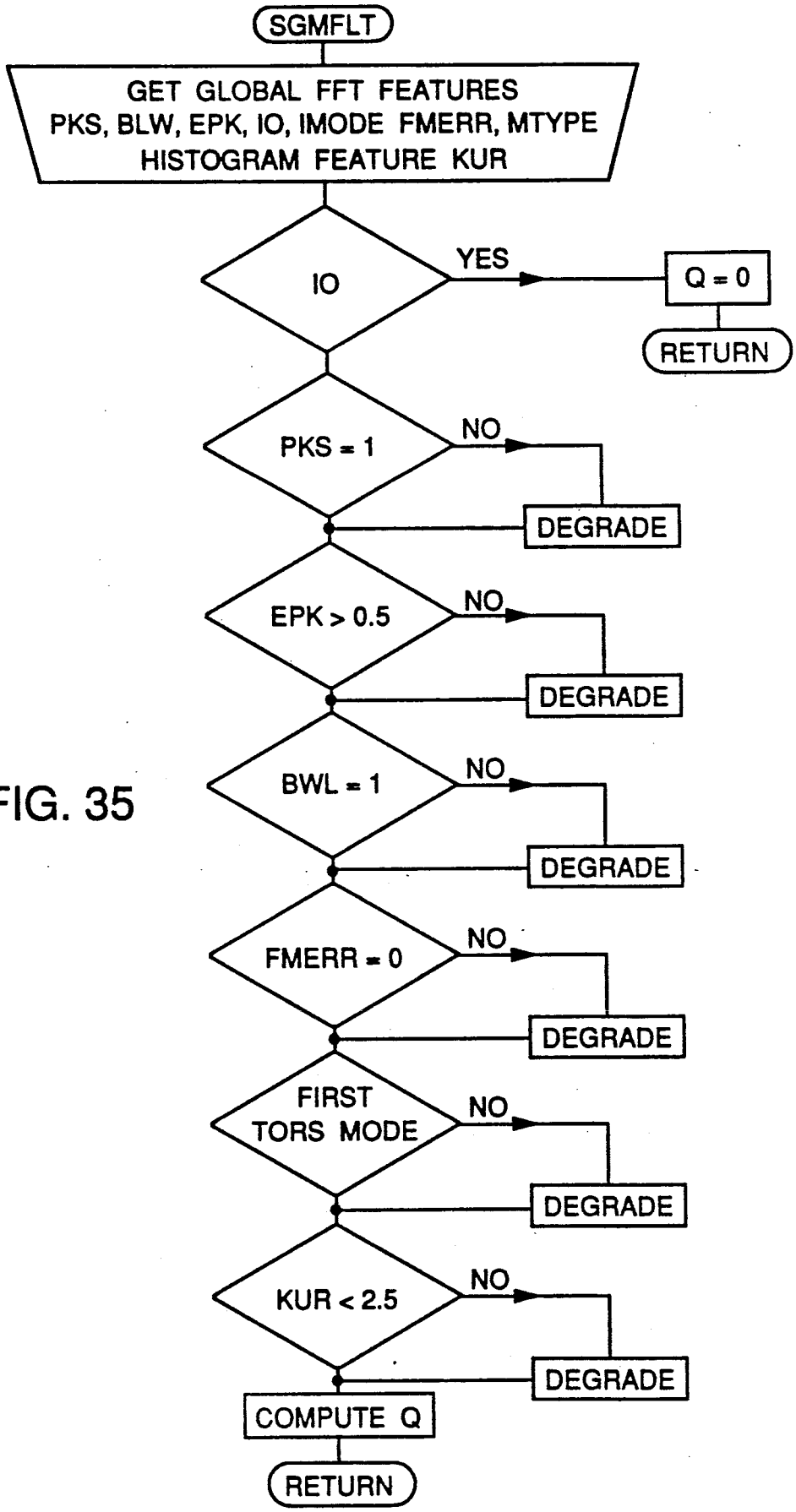

The SGMFLT subroutine (FIG. 35) detects flutter phenomena. Recall from Table 1 that flutter is characterized by a nonintegral order sinusoidal vibration which is usually a single mode, and usually the first torsional mode.

The SGMFLT subroutine requires the FFT global features IO, PKS, EPK, BWL, FMERR, IMODE, and MTYPE. First the subroutine checks the integral order flag IO and sets the Q to zero if IO is nonzero (integral order). If IO is zero, the subroutine checks for a single peak containing 50% or more of the energy, having a bandwidth of one sample and corresponding to the first torsional mode. The nominal degradation constants are given in Table 7 starting at location (1,4,7,2,2,1,1,0).

Figure 36:
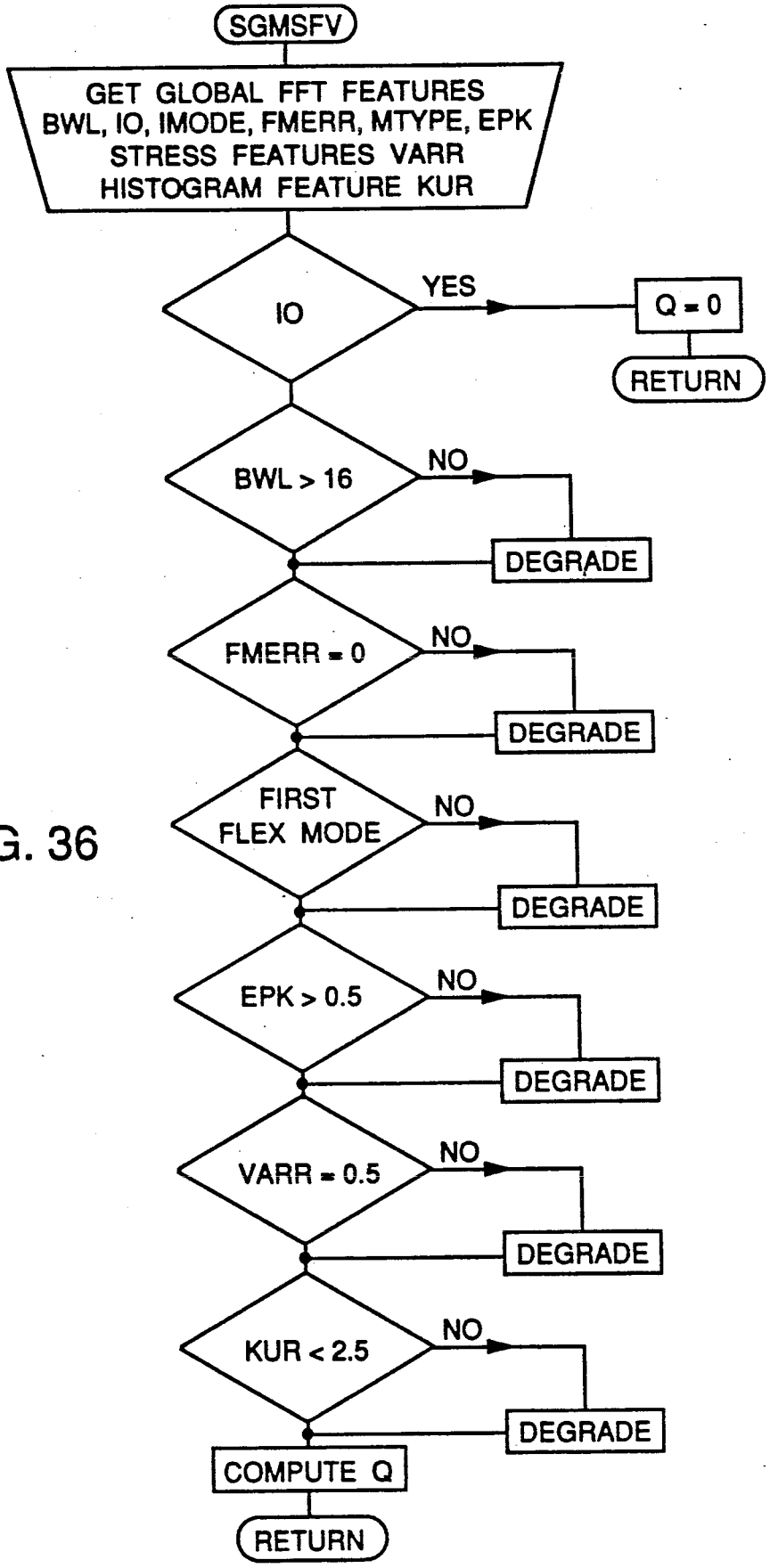

The SGMSFV subroutine (FIG. 36) detects separated flow phenomena. Recall from Table 1 that separated flow vibration is characterized by a random modulation of a blade mode, usually the first bending mode, and is nonintegral order.

Figure 37:
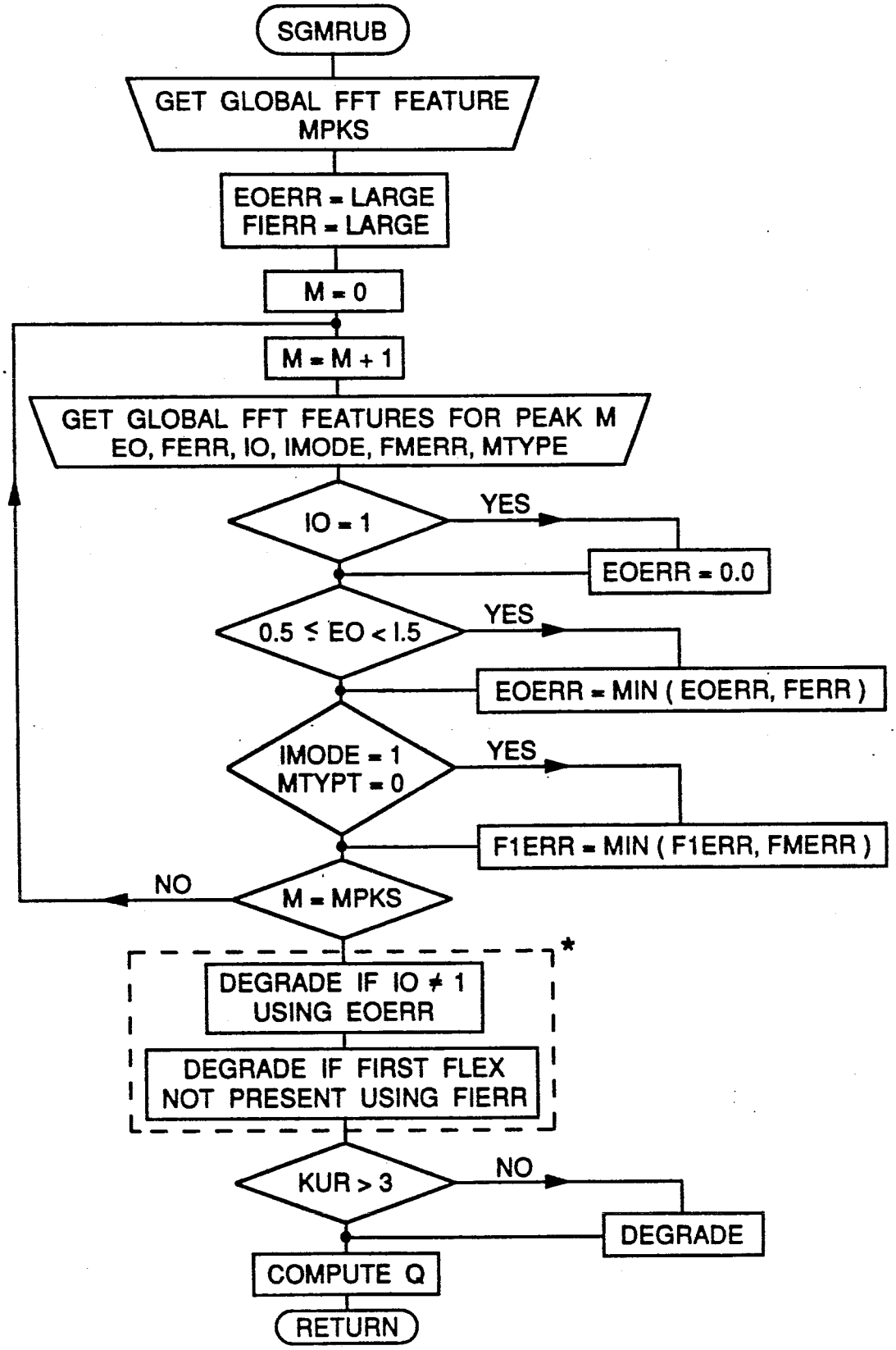

The SGMRUM subroutine (FIG. 37) detects blade rubbing. Recall from Table 1 that a rub vibration is characterized by a one-per-rev excitation which excites a first bending or first torsional mode. However, the signature of the vibration varies widely with the circumferential extent of the excitation. In looking at a single data block, the only generalizations are that the rub vibration will usually exhibit multiple peaks, with one peak being first engine order and one peak corresponding to a blade mode, usually first bending.

The SGMRUB subroutine requires the FFT global features EO, IO, FERR, IMODE, FMERR, and MTYPE for all peaks. The subroutine processes each peak and computes the minimum engine-order error (EOERR) and the minimum modal error (FIERR). If no peak has IO=1 then the Q value is degraded using EOERR. Similarly, the Q value is degraded if a blade mode is not detected.

Figure 38:
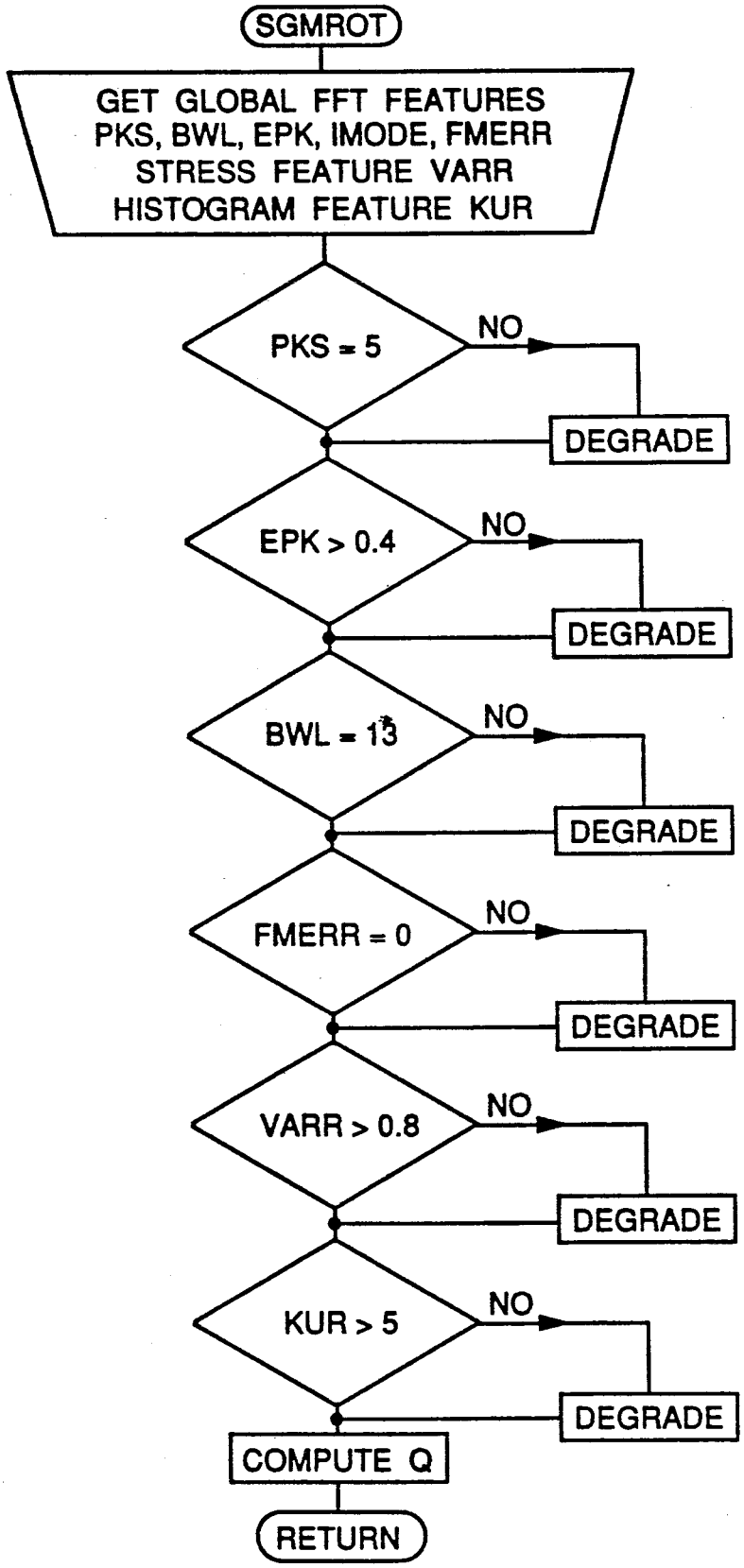

The SGMROT subroutine (FIG. 38) detects a rotating stall. Recall from Table 1 that a rotating stall is characterized by the stall cells impacting the part. When the frequency of these impacts coincides with a modal frequency, resonance occurs. The resonance can be either integral or nonintegral order.

The SGMROT subroutine requires the FFT global features PKS, BWL, EPK, IMODE and FMERR. Since a rotating stall looks like a resonance phenomenon, it is detected as such.

The SGMSRG subroutine detects a surge phenomenon. Recall from Table 1 that a surge is characterized by a short duration, high intensity vibration having a heavy first bending mode content. The impulse nature of the surge excites many blade modes and produces a wide spectral bandwidth.

The SGMSRG subroutine requires the FFT global features PKS, IO, IMODE, FMERR and MTYPE. In addition, the global stress feature VARP is used as a measure of nonstationarity. The impulse nature of the surge implies that the surge is nonstationary and nonintegral order. Thus if IO is nonzero then the Q value is set to zero, and if VARP is less than the nominal value of 0.8 then the Q is degraded. The Q is further degraded if the main energy peak does not correspond to the first bending mode.

Figure 39:
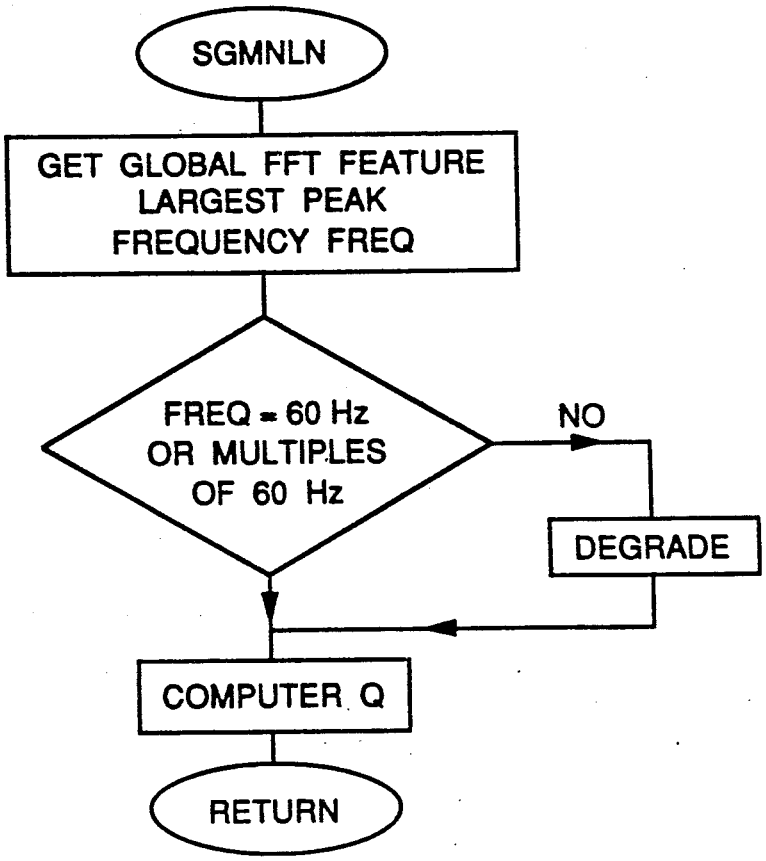

The SGMNLN subroutine (FIG. 39) detects line noise. Line noise is characterized by 60-Hz frequency and/or its higher harmonics an is detected as such.

The SGMNSR subroutine detects slip-ring noise. Slip-ring noise is characterized by one-per-rev noise bursts usually on one side of the stress signal. The subroutine requires the FFT global features EO, BWL, BWU, IMODE and FMERR, and the histogram global feature SKW.

The subroutine first checks the main FFT peak against the known blade modes and set the Q value to zero if a correspondence is found. If the main peak is not first engine order the Q value is degraded, the randomness of the slip-ring noise is checked by the upper and lower bandwidths, BWU and BWL. The one-sided nature of the noise is checked by the skewness (SKW) of the histogram.

Figure 40:
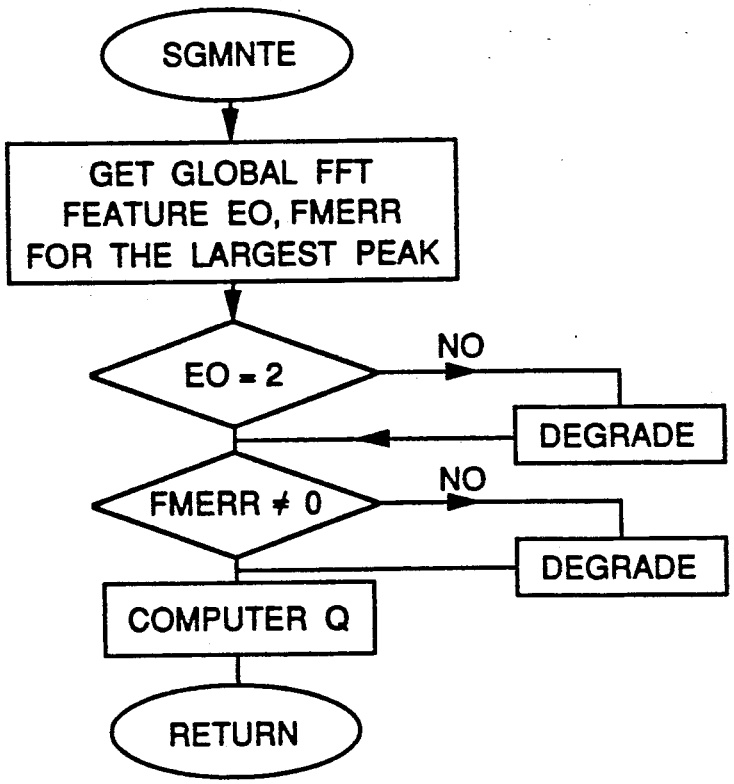

The SGMNTE subroutine (FIG. 40) detects telemetry noise. Telemetry noise is characterized by two-per-rev (i.e. 2E) sinusoidal waveform but in general the 2E frequency does not correspond to the blade frequency except at resonant condition. The subroutine requires the FFT features EO and FMERR for the largest peak of FFT spectrum. The 2E frequency is checked by the engine order EO and the separation from the blade modal frequency is checked by the feature FMERR.

Figure 41:
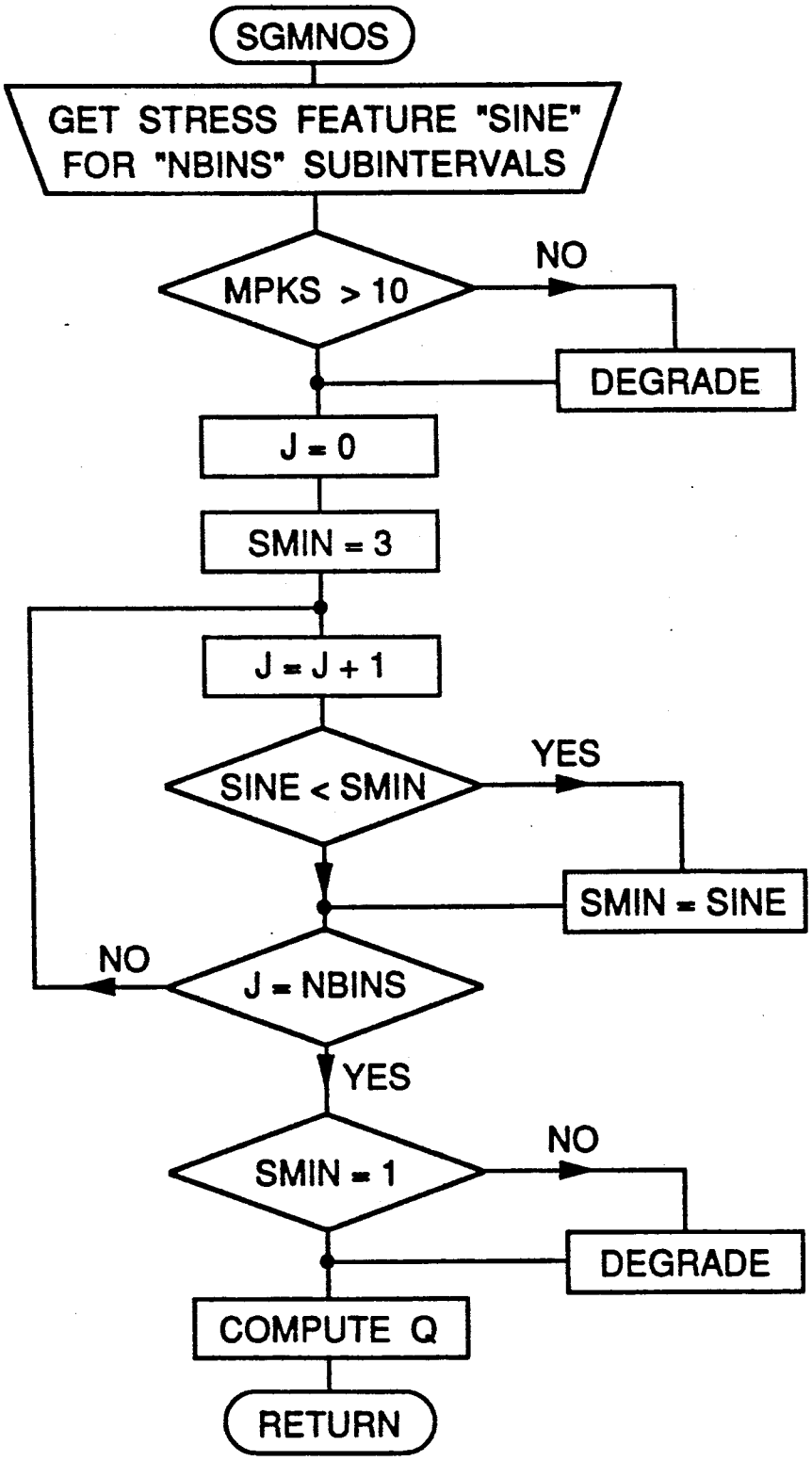

THE SGMNOS subroutine (FIG. 41) detects open or short circuits in the strain-gage instrumentation. An open or a short circuit is characterized by the signal either saturating or going to zero at random times for arbitrarily long durations. The subroutine requires the stress value SINE for all subintervals of the data block. If the value of SINE (which measures the peak to RMS ratio) is equal to unity in any subinterval then the stress value is a constant in that interval, which is tantamount to an open or short condition.

Figure 42:
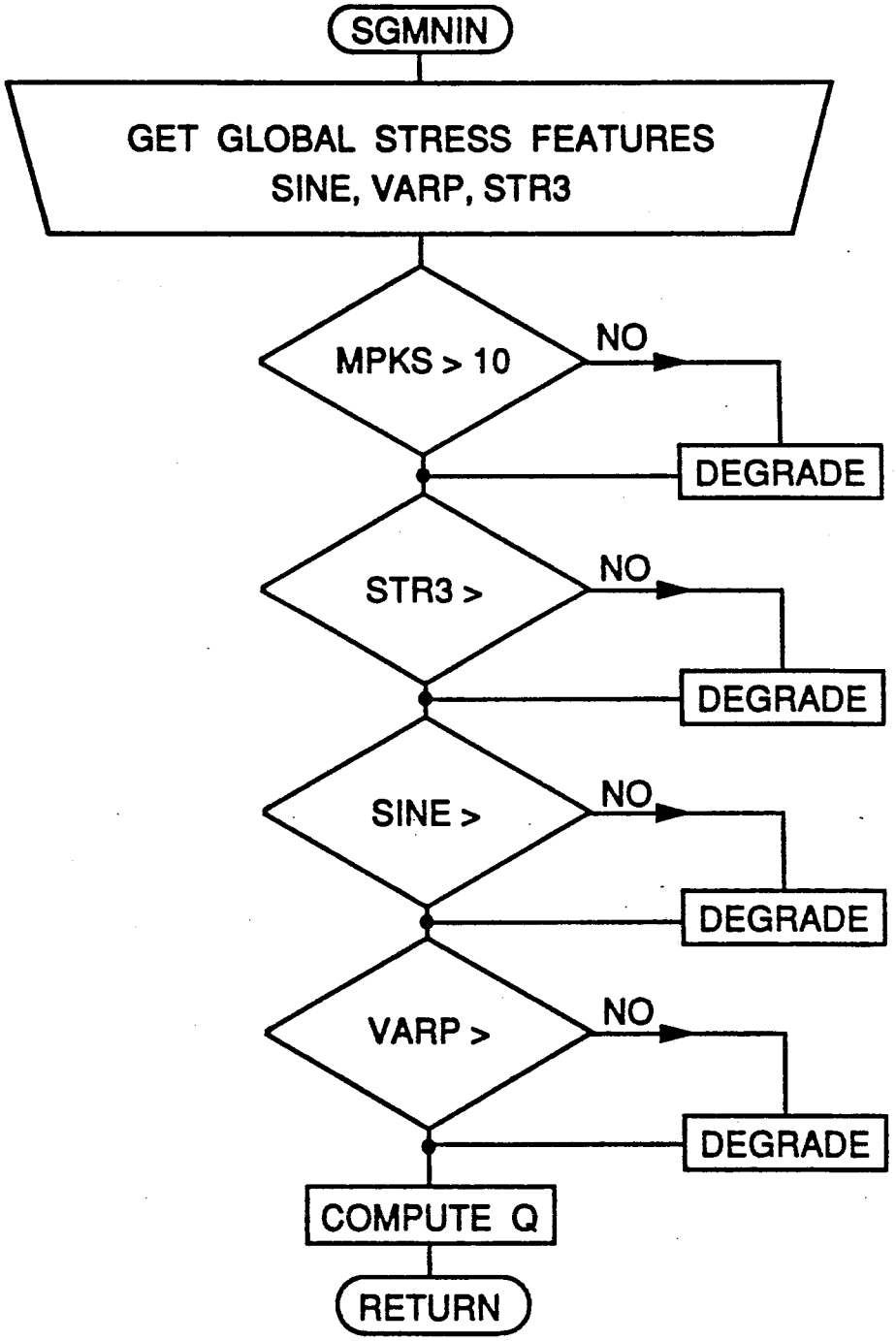

The SGMNIN subroutine (FIG. 42) detects intermittent noise. Intermittent noise is characterized by nonstationary bursts of high intensity. The subroutine requires global stress features, STR3, SINE and VARP. The STR3 value is the third largest value in the data block, and thus is an indicator of the high intensity noise bursts. It is used instead of the peak value STRP because of the ever present possibility of data outliers, as discussed earlier. The SINE feature is a measure of randomness, and the VARP feature is a measure of nonstationarity. The nominal degradation constants start at location (1,4,7,2,8,1,1,0).

The SGEVT subroutine combines the individual strain-gage results stored in the Spatial file and computes the event probabilities for the current time epoch. This computation incorporates the interblade and interstage features given in Table 1. The subroutine requires the run options NUNFB, PSLO and PSHI which are used to define the front and back regions of the compressor, and the percent-speed high and low values. The subroutine also requires ! values, location information and global features from all strain gages stored in the spatial file. The specific features used are ITH, STR3, STRR, FPK, VPK, VPHS and SPK.

The SGEVT subroutine first combines the individual Q-values from each strain gage by selecting the maximum Q-value for each category using all the strain-gage results. This form of combination is justified for several reasons. First, for many phenomena the individual part vibrations are highly correlated. For example, a stage resonance implies that all parts are at (or near) resonance. However, due to slight variations in the resonance frequencies of the parts, certain parts will be at resonance while other parts will be slightly off resonance. The Q-values for the strain gages will reflect this variation, with certain gages giving a Q for resonance of, say 0.95, while other gages give a resonance Q of say 0.70. In this case, the high Q value is the more reliable indicator of resonance. A second reason for selecting the maximum value is due to the absence of an underlying probability density function which would be required to optimally combine the Q values. Finally, if the Q values were combined as though they were independent then the resulting Q values would be unrealistically high. For example, suppose eight strain gages had Q values of 0.2 then the overall Q (assuming independence) would be 0.84.

The SGEVT subroutine next determines the number of compressor units NUINV that have been instrumented with strain gages, and the number of units NUTHR having at least one part exceeding threshold. If NUINV is unity, then spatial combination cannot be performed since there is no way of knowing whether the component is confined to the single instrumented unit.

If more than one unit is instrumented, the subroutine checks the number of units actually exceeding threshold. For a single unit exceeding threshold, if all the parts on the unit are involved (exceed threshold) then the ITOTB flag is set to unity. In addition, a check is made on adjacent instrumented units to determine if there exists a low level blade response matching the frequency of the dominant unit. If such a match is found, the adjacency flag is set to unity. For multiple unit involvement, the ITOTUN flag is set to unity if every instrumented unit is involved. The involvement is checked to see whether it is confined to the front or back of the compressor, as determined by the NUNFB parameter, and if so the IFRONT or IBACK flag is set to unity.

The Q values for the individual categories are degraded using the spatial features described above. For resonance, the Q is degraded if multiple units are involved or, in the case of axial dovetail blades, if not all instrumented blades on the unit are involved. For flutter, the Q is degraded if multiple units are involved or if all instrumented blades on the unit are involved. For rub, the Q is degraded if multiple units are involved. For surge, the Q is degraded if any instrumented unit is not involved. For rotating stall, the Q is degraded if no adjacent stage is involved at a low level. For separated flow vibration, the Q is degraded of the unit involvement is not confined to the front (back) of the compressor at low (high) speed. The above degradations are incorporated in the computation of the event probabilities, which are then stored in the Event file.

Figure 43:
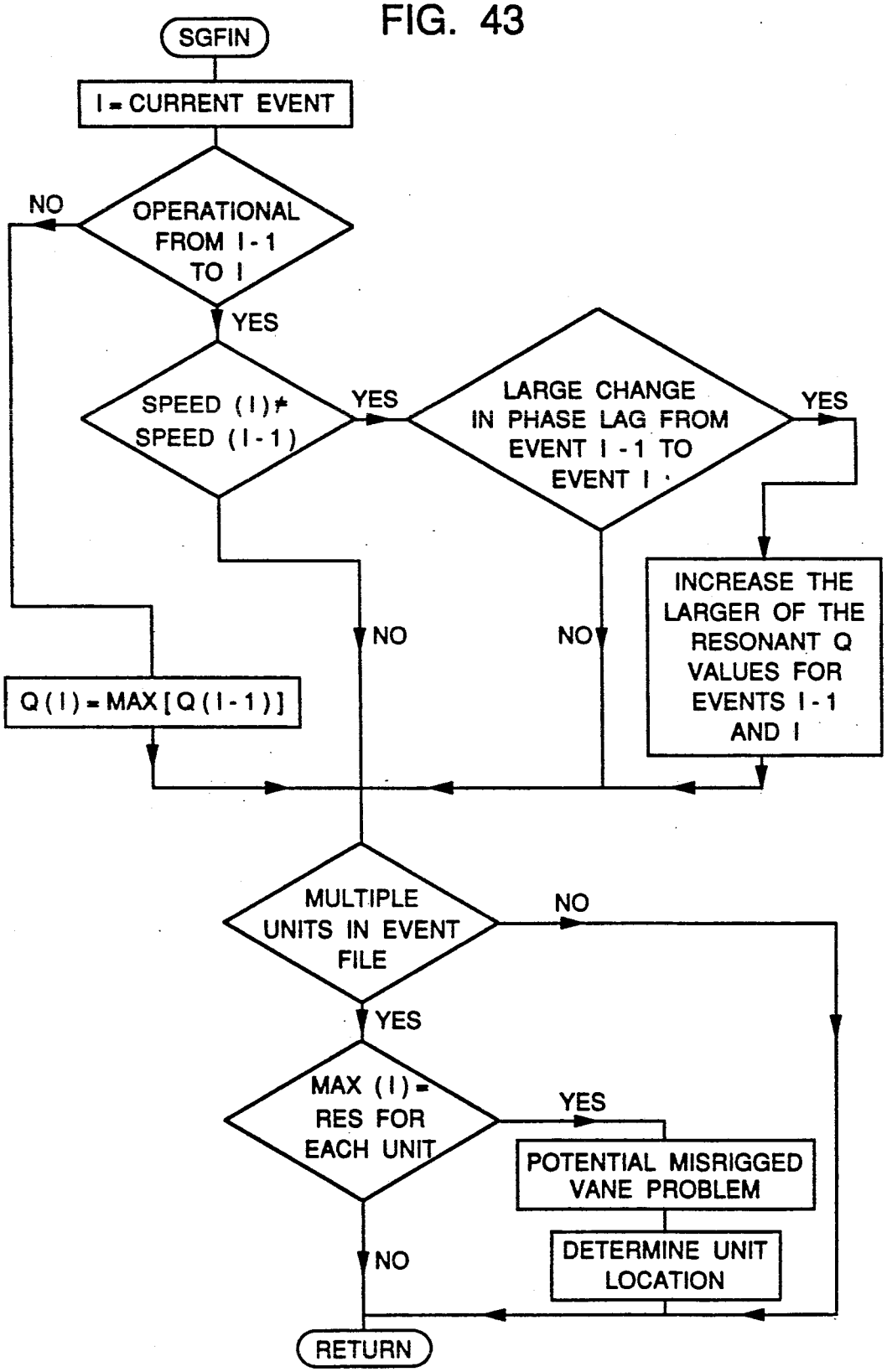

The SGFIN subroutine (FIG. 43) combines the event probabilities stored in the Event file with on-line transient information to compute running, final category probabilities. This computation, referred to as temporal combination, incorporates the "occurs-with" and "speed dependence" features given in Table 1.

As each event is processed by the SGEVT subroutine the event probabilities along with on-line control information are stored in the next available location in the Event file. The SGFIN subroutine compares the new event to the preceding event and if no engine control changes have occurred the new event probabilities are combined with the preceding probabilities suing a maximum selection rule, and the new event is discarded. If a control change is detected, then the new event remains stored and no combination with the previous event is performed. If a speed change has occurred and the present maximum Q value compared with the previous maximum Q value indicates that a unit has moved onto or off of a resonance condition then the resonance Q value is increased to the value $Q_{NEW}=1-(1-Q_{OLD})^2$, the assumption being that the two events are independent and have equal Q values. Finally, if multiple units are represented in the event file and if the maximum Q on each unit corresponds to flutter or resonance, then a vane problem is likely to be the cause. The unit having the vane problem can be localized by noting the location of the affected units. The running probabilities are reported to the operator along with as much, or as little supporting information as desired.

The strain-gage signal interpretation system described above is capable of monitoring and interpreting strain gage signals from jet engine compressor stages. In use, a comprehensive strain-gage data bank is first generated that contains all major categories of aeromechanical phenomena and noise signals from fan and compressor stages of various engines. The strain-gage data is analyzed in the time domain as well as the frequency domain so that significant signal features are identified for various types of aeromechanic phenomena and noise. These individual signal features are combined with spatial (interblade and interstage), temporal and other syntactic features to form a complete feature set for each aeromechanical phenomenon or noise type.

The feature sets of all strain gages are used in a three-level classifier system to determine the probability values of each possible aeromechanical phenomenon and noise type. The first level of classification uses only the individual strain-gage features to determine the category probability for each phenomena and noise type. The second level of classification utilizes the spatial (interblade and interstage) features to refine the category pseudo-probability values and yield the event probability values. The third level of classification combines the temporal features with the event probability values to yield the final probabilities based on which decisions are made on the type of actions to be taken to ensure rig safety. Operator selective provisions are made to initiate early evasive actions for certain types of aeromechanical phenomena such as surge after the first or second level of classification if required. The modular structure of the three-level classifier allows easy expansion or reduction of the expert system components for system improvement or optimization.

The strain gage classifier is based on a degradation logic scheme designed to allow continued training of the classifier. The degradation logic involves several degradation constants that need to be specified. The degradation constants have been selected in this development effort for all major aeromechanic phenomena. For noise, only logical choices were made because of the difficulty in identifying the precise noise types for the noise signals compiled at the early stage of the program. However, the logical choices made for noise degradation constants are based on empirical experience and data derived from an operational turbine compressor engine. Further, information on the strain gage signal interpretation system is documented in reports filed at the Defense Technical Information Center, such as AFWAL-TR-85-2052 entitled "Development of Strain-Gage Signal Interpretation System" by Ray M. Chi et al, the disclosure of which is incorporated here by reference.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A digital diagnostics system which monitors aeromechanical performance of a gas turbine engine, said gas turbine engine having a compressor, a combustion chamber and a turbine, said digital diagnostics system comprising:

a plurality of strain gages at locations on said gas turbine engine, said strain gages outputting a plurality of actual analog strain signals in response to said aeromechanical performance of said gas turbine engine;

means for converting said analog strain signals from said plurality of strain gages into a plurality of actual digital strain signals;

a system memory within each of said plurality of strain gages and their locations are identified, said system memory also identifying a set of stored strain signals which are characteristic of a set of aeromechanical phenomena, said aeromechanical phenomena including: resonance, flutter, separated flow vibration, missing vane blade, rotating stall, surge, blade rub, non-resonant vibration, and short circuits in said gas turbine engine; and a means for correlating said set of stored strain signals from said system memory with said actual digital strain signals from said converting means to identify said aeromechanical phenomena of said gas turbine engine.

2. A digital diagnostics system, as defined in claim 1, wherein said correlating means comprises a data processor which is programmed to identify said aeromechanical phenomenon with a first, second, and third level of diagnosis, said first level of diagnosis including a first set of aeromechanical characteristics which are directly ascertainable from said actual digital strain gage signals, and including signal amplitudes, number of frequency peaks, and sinusoidal parity; said second level of diagnosis including a second set of aeromechanical characteristics which are ascertainable from a spatial distribution of the location of the strain gages that produce the strain gage signals and including interblade involvement and interstage involvement; said third level of diagnosis including a third set of aeromechanical characteristics being ascertainable by their temporal characteristics which include speed dependence and syntactic relationships in said actual digital gage signals.

3. A digital diagnostics system which monitors aeromechanical performance of a gas turbine, said gas turbine engine having a compressor, a combustion chamber and a turbine, said digital diagnostics system comprising:

a plurality of strain gages fixed at locations on said gas turbine engine, said strain gages outputting a plurality of actual analog strain signals in response to said aeromechanical performance of said gas turbine engine;

a means for converting said analog strain signals from said plurality of strain gages into a plurality of actual digital strain signals;

a system memory within which each of said plurality of strain gages and their locations are identified, said system memory also identifying a set of stored strain signals which are characteristic of a set of aeromechanical phenomena, said aeromechanical phenomena including: resonance, flutter, separated flow vibration, missing vane blade, rotating stall, surge, blade rub, non-resonant vibration, and short circuits in said gas turbine engine;

a means for identifying short circuits by correlating said set of stored strain signals from said system memory with said actual digital strain signals from said converting means to identify said short circuits;

a means for identifying nonresonant vibration by correlating said set of stored signals from said system memory with said actual digital signals from said converting means to identify said nonresonant vibration;

a means for identifying blade rub in said gas turbine engine by correlating said set of stored strain signals from said system memory with said actual digital strain signals from said converting means to identify said blade rub;

a means for identifying a surge in said gas turbine engine by correlating said set of stored strain signals from said system memory with said actual digital strain signals from said converting means to identify said surge in said gas turbine engine;

a means for identifying a rotating stall in said gas turbine engine by correlating said set of stored strain signals from said system memory with said actual digital strain signals from said converting means to identify said rotating stall;

a means for identifying a missing vane blade in said compressor of said gas turbine engine by correlating said set of stored strain signals from said system memory with said actual digital signals from said converting means to identify said vane blade;

a means for identifying separated flow vibration in said gas turbine by correlating said set of stored strain signals from said system memory with said actual digital strain signals from said converting means to identify said separated flow vibration; and a means for identifying flutter in said gas turbine engine by correlating said set of stored strain signals from said system memory with said actual digital signals from said converting means to identify said surge in said flutter.

* * * * *